US011811935B2

(12) United States Patent
Wooster et al.

(10) Patent No.: US 11,811,935 B2
(45) **Date of Patent: *Nov. 7, 2023**

(54) SYSTEMS FOR SECURE ACCESS TO PROTECTED CONTENT IN A CONTENT MANAGEMENT SYSTEM

(71) Applicant: Contentful GmbH, Berlin (DE)

(72) Inventors: Tony Wooster, Berlin (DE); Paolo Negri, Berlin (DE)

(73) Assignee: Contentful GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,658

(22) Filed: Mar. 15, 2022

(65) Prior Publication Data

US 2022/0376916 A1 Nov. 24, 2022

Related U.S. Application Data

(63) Continuation of application No. 17/475,818, filed on Sep. 15, 2021, now Pat. No. 11,277,266, which is a continuation of application No. 17/327,619, filed on May 21, 2021, now Pat. No. 11,258,608, which is a continuation of application No. 17/327,598, filed on May 21, 2021, now Pat. No. 11,228,437.

(51) Int. Cl.
*H04L 9/32* (2006.01)
*H04L 9/08* (2006.01)

(52) U.S. Cl.
CPC ............ *H04L 9/3226* (2013.01); *H04L 9/085* (2013.01)

(58) Field of Classification Search
CPC .............................. H04L 9/3226; H04L 9/085
See application file for complete search history.

(56) References Cited

U.S. PATENT DOCUMENTS 8,397,073 B1 * 3/2013 Richardson ........... H04L 9/3247 713/168
9,392,075 B1 * 7/2016 Radovnikovic .... H04N 21/8586
2014/0344908 A1 * 11/2014 Rizzo .................... H04L 63/126 709/219
2015/0089233 A1 * 3/2015 Roth ..................... H04L 63/102 713/168
2017/0339229 A1 * 11/2017 Miller ...................... H04L 67/55
2018/0077222 A1 * 3/2018 Shnitko ................... H04L 67/06

OTHER PUBLICATIONS

PCT/US2022/030010, International Search Report, dated Jun. 17, 2022.

* cited by examiner

*Primary Examiner* — Henry Tsang
(74) *Attorney, Agent, or Firm* — Penilla IP, APC

(57) ABSTRACT

A method performed by a CMS and an edge node of a CDN is provided, including: sharing a server secret between the CMS and the edge node; using, by the CMS, the server secret to generate a signing key, the signing key being transmitted to a client system, wherein the client system receives a request for a content item from a user device, and wherein the client system uses the signing key to generate a signed URL for the content item, the user device being redirected to the signed URL; responsive to receiving the signed URL from the user device, then validating the signed URL by the edge node, wherein validating the signed URL uses the server secret to rederive the signing key based on the signed URL; responsive to successful validation of the signed URL, then providing the content item from the edge node to the user device.

10 Claims, 14 Drawing Sheets

112
Web Editor
104
Content Management API
200
Content Project/Space
202
Environment (e.g. version)
204
Entry
Entry
Entry
Entry
210
Asset
212
Binary File
Asset
Binary File
206
Content Model
208
Type
Type
Type
Environment (e.g. version)
Entry
Entry
Assets
Binary File
Content Model
Type

1300

C Learning center Help Center

Space home | Content model | Content | Media | Apps | Settings

Content

Scheduled Content

Shared views | My views

All 1304

Content Type (11)

Help Center - Index

Help Center - Category

Help Center - Article

Help Center – Article Group

Help Center – Microcopy

Help Center – FAQ Entry

Help Center – Content Tag

Help Center – Code Snippet

Help Center – Banner

Help Center – Table

Add Folder

Content type | Any | Type to search for entries | Filter | Save as view | Add entry

1302

| Name | Updated | Author | Status |
|---|---|---|---|
| contentful-overview | Jun 25, 2020 | John G. | Published |
| Getting started | Jun 24, 2020 | Rachel S. | Published |
| contentful-web-app-overview | Jun 24, 2020 | Rachel S. | Published |
| change-name | Jun 24, 2020 | Rachel S. | Published |
| user-profile | Jun 24, 2020 | Rachel S. | Published |
| Can I embed the Contentful web app as an iframe? | Jun 23, 2020 | Mary M. | Published |
| How to handle tables in Rich Text Field? | Jun 23, 2020 | Mary M. | Published |
| Can records be shared between spaces/organizations? | Jun 23, 2020 | Mary M. | Published |
| How to reduce the loading time of my website? | Jun 23, 2020 | Mary M. | Published |
| How to find a Contentful developer? | Jun 23, 2020 | Mary M. | Published |
| How to import content | Jun 23, 2020 | Mary M. | Published |

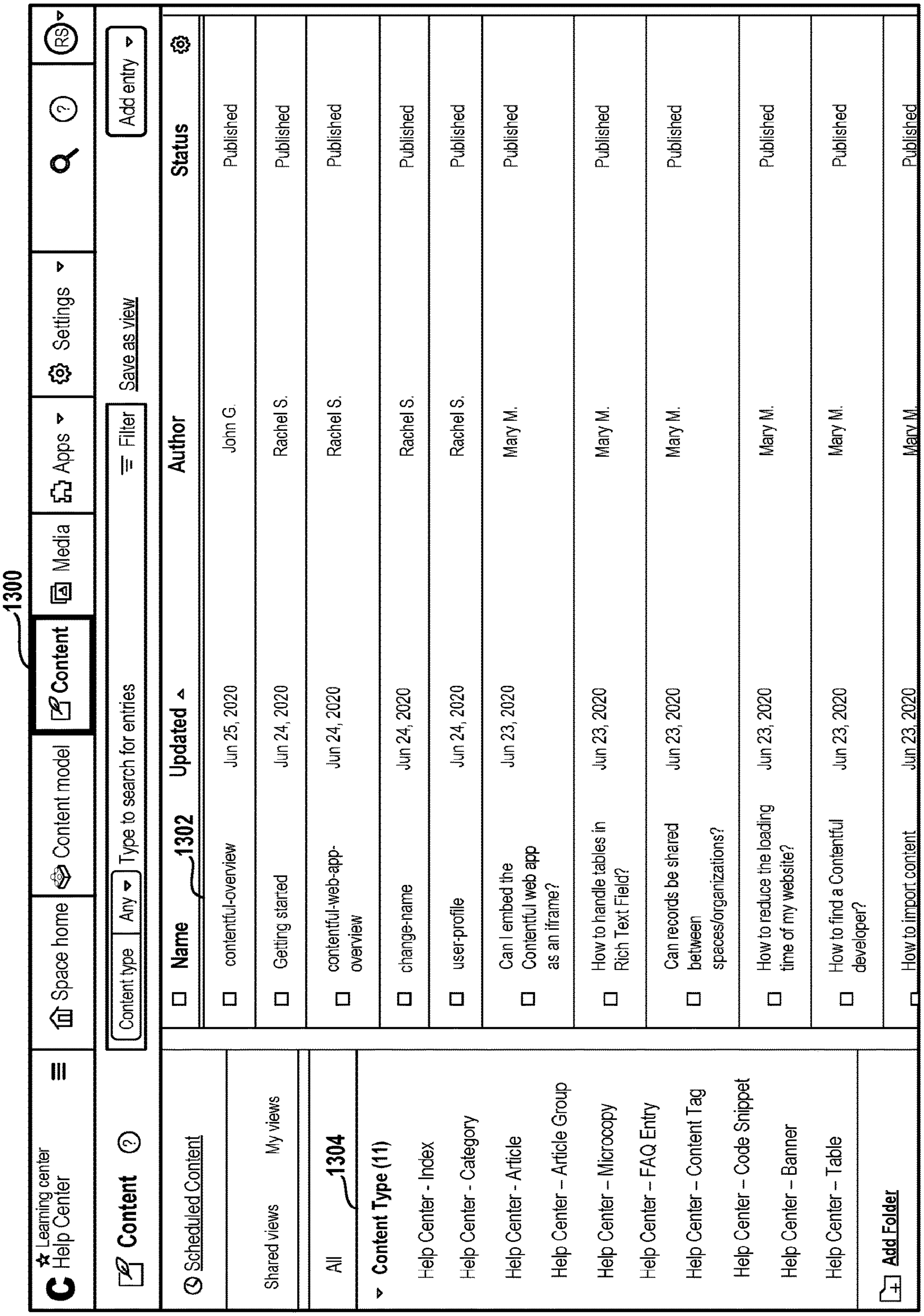

Fig. 10

Help Center - Article
Untitled 0
Editor

Title (required)
Adding a new entry
18 characters
Maximum 256 characters
Use sentence case. Title should be same as the H1 in the content rich text field.
1400

Slug (required)
0 characters
Maximum 256 characters
Title in kebab case (e.g. how-to-contentful). Used in page url. Once published must not be changed.
1402

Preview Description (required)
Short description of article contents. Will be seen when page turns up in search results, social media posts, etc.
1404

Content (required)
Normal Text B I U <> ” —
+ Embed
1406

General Comments Info

STATUS
Current DRAFT
Publish
Last saved a few seconds ago

TASKS
No tasks have been defined yet.
+ Create new task

PREVIEW
Open preview

LINKS
No other entries link to this entry.

TRANSLATION Multiple locales
en-US Change

VERSIONS

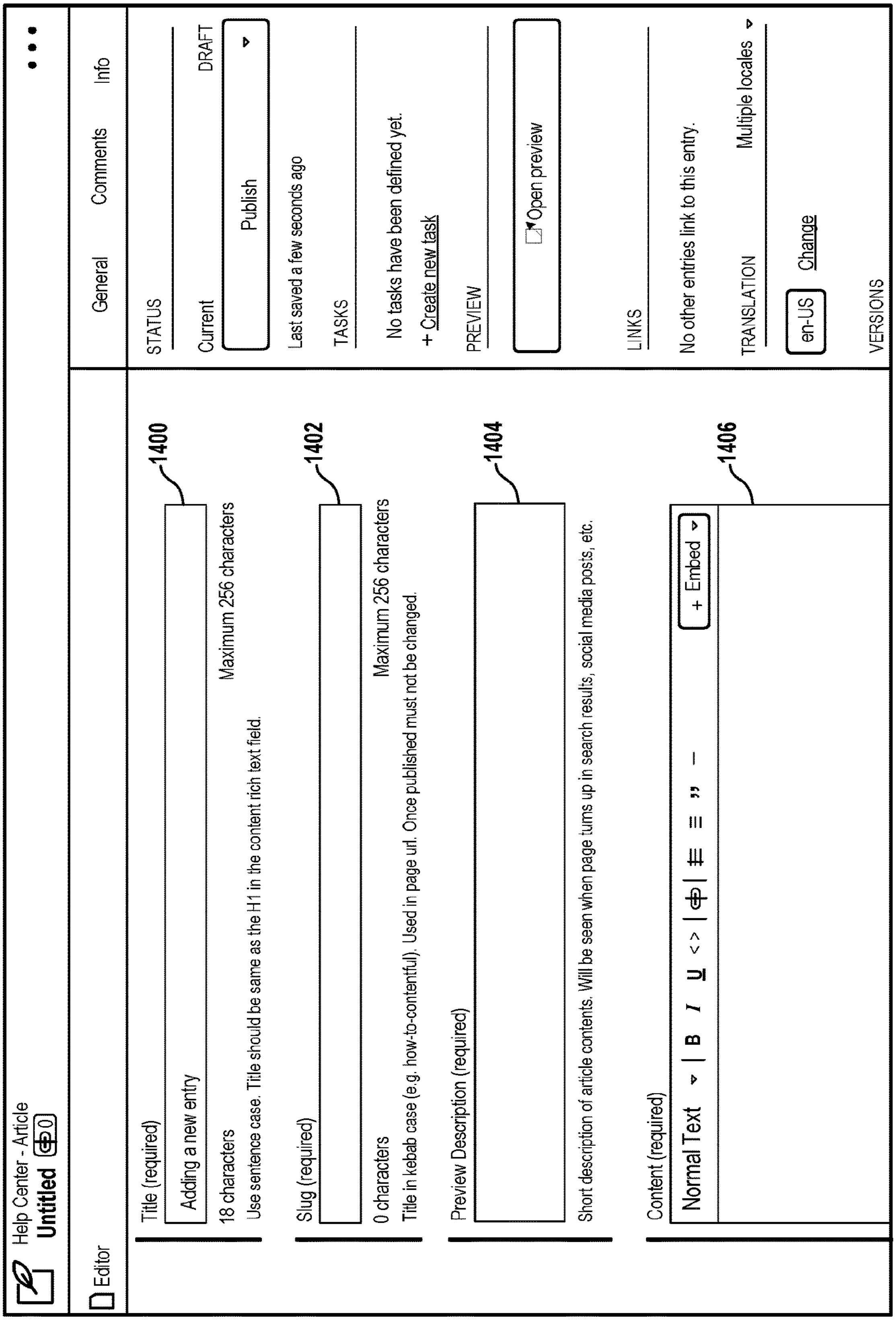

Fig. 11

| Prev... | Name | Dimensions | Type | Updated | By | Status |
|---|---|---|---|---|---|---|
| | entry-editor | 2560 x 167... | Image png | a few second... | Me | Published |
| | Contentful web app ov... | 2728 x 180... | Image png | 4 minutes a... | Me | Published |
| | manage tags permission | 1195 x 587 px | Image png | Tue, 2:11 PM | Me | Published |
| | search-tags-columns | 1674 x 599 px | Image png | Tue, 1:58 PM | Me | Published |
| | tags-bulk-editor | 2430 x 126... | Image png | Jun 26, 2020 | Me | Published |
| | add-remove-tags-option | 1912 x 836 px | Image png | Jun 19, 2020 | Malin Sofrone | Published |
| | add-new-environment | 500 x 323 px | Image png | Jun 11, 2020 | Me | Published |
| | content-preview-disco... | 500 x 306 px | Image png | Jun 11, 2020 | Me | Published |
| | content-preview | 500 x 322 px | Image png | Jun 11, 2020 | Me | Published |
| | final-preview | 500 x 384 px | Image png | Jun 11, 2020 | Me | Published |
| | tags-entry | 2444 x 756... | Image png | Jun 10, 2020 | Me | Published |

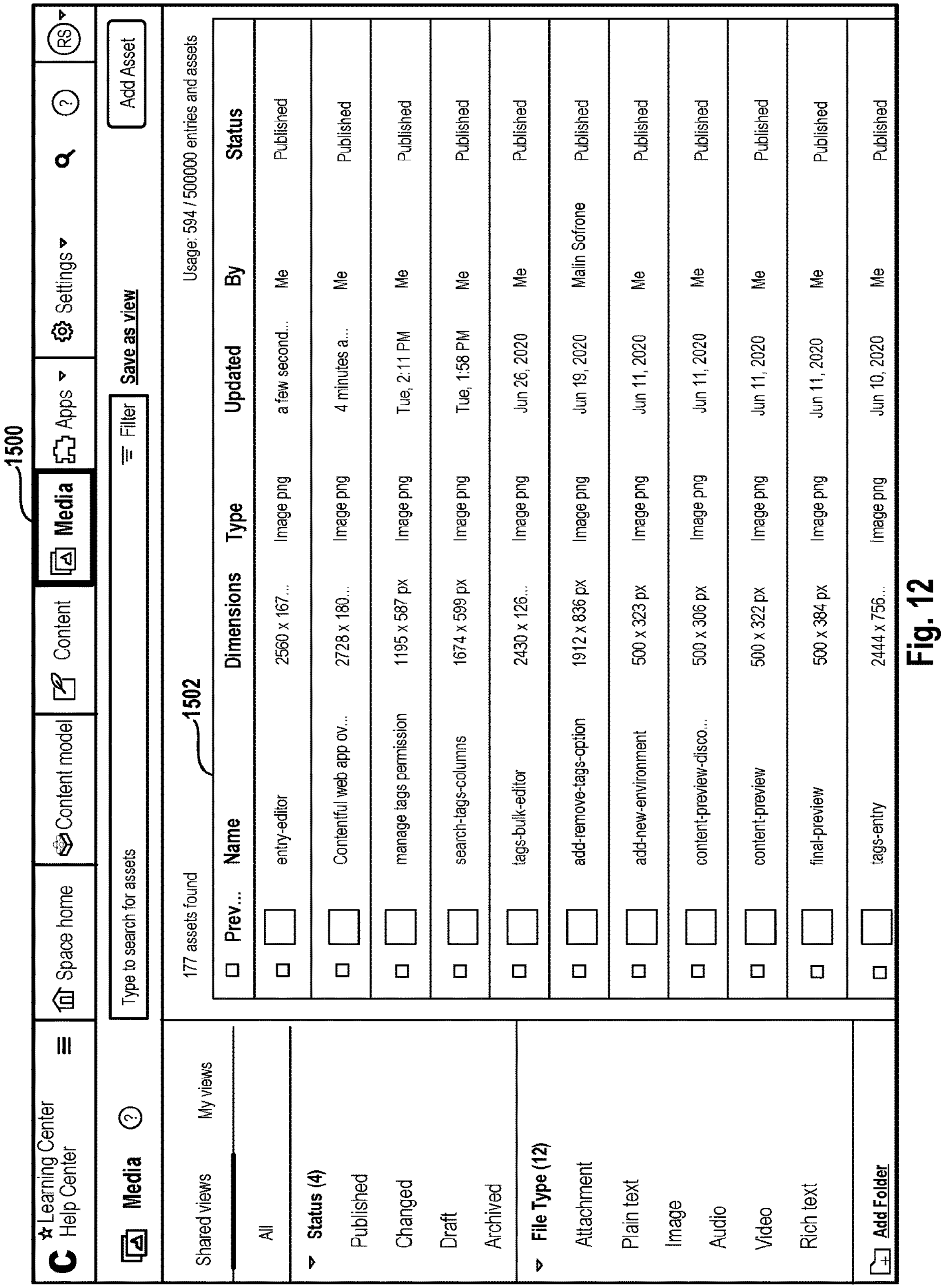

Fig. 12

SYSTEMS FOR SECURE ACCESS TO PROTECTED CONTENT IN A CONTENT MANAGEMENT SYSTEM

CLAIM OF PRIORITY

This application claims priority as a continuation and the benefit of U.S. patent application Ser. No. 17/475,818 filed on Sep. 15, 2021 (U.S. Pat. No. 11,277,266, issued on Mar. 15, 2022), entitled "SYSTEMS FOR SECURE ACCESS TO PROTECTED CONTENT IN A CONTENT MANAGEMENT SYSTEM," which is a further continuation of U.S. patent application Ser. No. 17/327,619 filed on May 21, 2021 (U.S. Pat. No. 11,258,608, issued on Feb. 22, 2022), entitled "SYSTEMS FOR SECURE ACCESS TO PROTECTED CONTENT IN A CONTENT MANAGEMENT SYSTEM," which is a further continuation of U.S. patent application Ser. No. 17/327,598, filed on May 21, 2021 (U.S. Pat. No. 11,228,437, issued on Jan. 18, 2022), entitled "METHODS FOR SECURE ACCESS TO PROTECTED CONTENT IN A CONTENT MANAGEMENT SYSTEM," the disclosures of which are incorporated herein by reference in their entirety for all purposes.

BACKGROUND

1. Field of the Disclosure

The present disclosure relates to methods and systems for providing authenticated access to protected/embargoed content in a content management system.

2. Description of the Related Art

A content management system (CMS) is useful for enabling organizations to create and edit digital content in a structured manner. A given organization's content can be broken down into modular reusable components, enabling deployment of content in a variety of combinations to suit different presentation contexts. Further, the appearance of content can be adjusted to suit the presentation context at the time it is retrieved and presented to the consuming end user.

In the implementation of a CMS, a basic issue is that customers want to be able to restrict access to individual asset files that they have stored in the CMS. However, most of the access control mechanisms that are provided by the CMS are access token-based controls. In such systems, if a user possesses this access token, then they tend to have access to a great amount of content, if not all content associated with the customer account.

Such an access scheme may be sufficient for certain use cases but for many other use cases a more granular access scheme is needed. Such granular access schemes may be implemented by authorization proxy, but this sort of solution incurs a performance penalty due to the asset proxy overhead.

It is in this context that implementations of the disclosure arise.

SUMMARY

Implementations of the present disclosure include methods and systems relating to providing authenticated access to protected/embargoed content in a content management system (CMS).

In one embodiment, a method performed by a content management system (CMS) and an edge node of a content delivery network is provided, including the following operations: sharing a server secret between the CMS and the edge node; using, by the CMS, the server secret to generate a signing key, the signing key including a signing secret generated using the server secret, the signing key being transmitted to a client system, wherein the client system receives a request for a content asset from a user device and authorizes said user device for access to the content asset, and wherein the client system uses the signing key to generate a signed URL for the content asset, the user device being redirected to the signed URL; responsive to receiving, by the edge node, the signed URL from the user device, then validating the signed URL by the edge node, wherein validating the signed URL uses the server secret to rederive the signing secret based on the signed URL; responsive to successful validation of the signed URL by the edge node, then providing the content asset from the edge node to the user device.

In some implementations, the signing key includes a policy identifying a group of content assets that are accessible using the signing key, and wherein the policy further identifies an expiration time of the signing key.

In some implementations, the signing secret is generated based on the policy and the server secret.

In some implementations, validating the signed URL further includes using the rederived signing secret to verify that the signed URL was generated using the signing secret.

In some implementations, the signed URL defines expiration for the signed URL.

In some implementations, the method enables validation of secure access to the content asset without requiring communication to the CMS.

In another embodiment, a system comprising a content management system (CMS) and an edge node of a content delivery network is provided, said CMS and edge node configured to perform a method including the following operations: sharing a server secret between the CMS and the edge node; using, by the CMS, the server secret to generate a signing key, the signing key including a signing secret generated using the server secret, the signing key being transmitted to a client system, wherein the client system receives a request for a content asset from a user device and authorizes said user device for access to the content asset, and wherein the client system uses the signing key to generate a signed URL for the content asset, the user device being redirected to the signed URL; responsive to receiving, by the edge node, the signed URL from the user device, then validating the signed URL by the edge node, wherein validating the signed URL uses the server secret to rederive the signing secret based on the signed URL; responsive to successful validation of the signed URL by the edge node, then providing the content asset from the edge node to the user device.

In another embodiment, a method managing access to content requested from a content management system (CMS) is provided, the content management system operates using a plurality of servers that manage operations for editing of said content and presentation of said content when requested via application programming interface (API) calls, the plurality of servers of the content management system is further interfaced with a plurality of edge nodes of a content delivery network, the method including the following operations: receiving, by the content management system, a request for a signing key from a customer device of the content management system, the request is for requested content identified by a user device of the customer, the user device of the customer being authenticated by the customer before the request is received by the content management system; generating, by the content management system, a signing secret and a policy responsive to the request of the signing key, the signing secret being generated using a server secret that is shared between the edge node and the content management system; and, receiving, by the edge node, a signed URL from the user device, the signed URL is generated using the signing secret and the policy, the signed URL is processed by the edge node to return the requested content to the user device based on the policy.

In some implementations, processing the signed URL includes, validating the signed URL by the edge node; the validating includes using the server secret to rederive the signing secret from said signed URL.

In some implementations, said validating is processed by said edge node without requiring further communication with a server of the content management system.

In some implementations, said policy is for a group of content assets associated with the requested content, and said policy further identifies an expiration time associated with the signing key.

In another embodiment, a content management system is provided, said content management system operating using a plurality of servers that manage operations for editing of content and presentation of said content when requested via application programming interface (API) calls, the plurality of servers of the content management system is further interfaced with a plurality of edge nodes of a content delivery network, the method including the following operations: the content management system is configured to process a request for a signing key from a customer device of the content management system, the request is for requested content identified by a user device of the customer, the user device of the customer being authenticated by the customer before the request is received by the content management system; the content management system is configured to generate a signing secret and a policy responsive to the request for the signing key, the signing secret being generated using a server secret that is shared between the edge node and the content management system; and, the edge node is configured to receive a signed URL from the user device, the signed URL is generated using the signing secret and the policy, the signed URL is processed by the edge node to return the requested content to the user device based on the policy.

In some implementations, the edge node processes validating the signed URL by the edge node, the validating includes using the server secret to rederive the signing secret from said signed URL.

In some implementations, said validating is processed by said edge node without requiring further communication with a server of the content management system.

In some implementations, said policy is for a group of content assets associated with the requested content, and said policy further identifies an expiration time associated with the signing key.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 10 illustrates an interface view of a Content tab of a CMS editorial application, in accordance with implementations of the disclosure.

FIG. 11 illustrates an interface view of an entry editor of a CMS editorial application for adding a new entry to a content project/environment, in accordance with implementations of the disclosure.

FIG. 12 illustrates an interface view of a Media tab of a CMS editorial application, in accordance with implementations of the disclosure.

DETAILED DESCRIPTION

Figure 1:
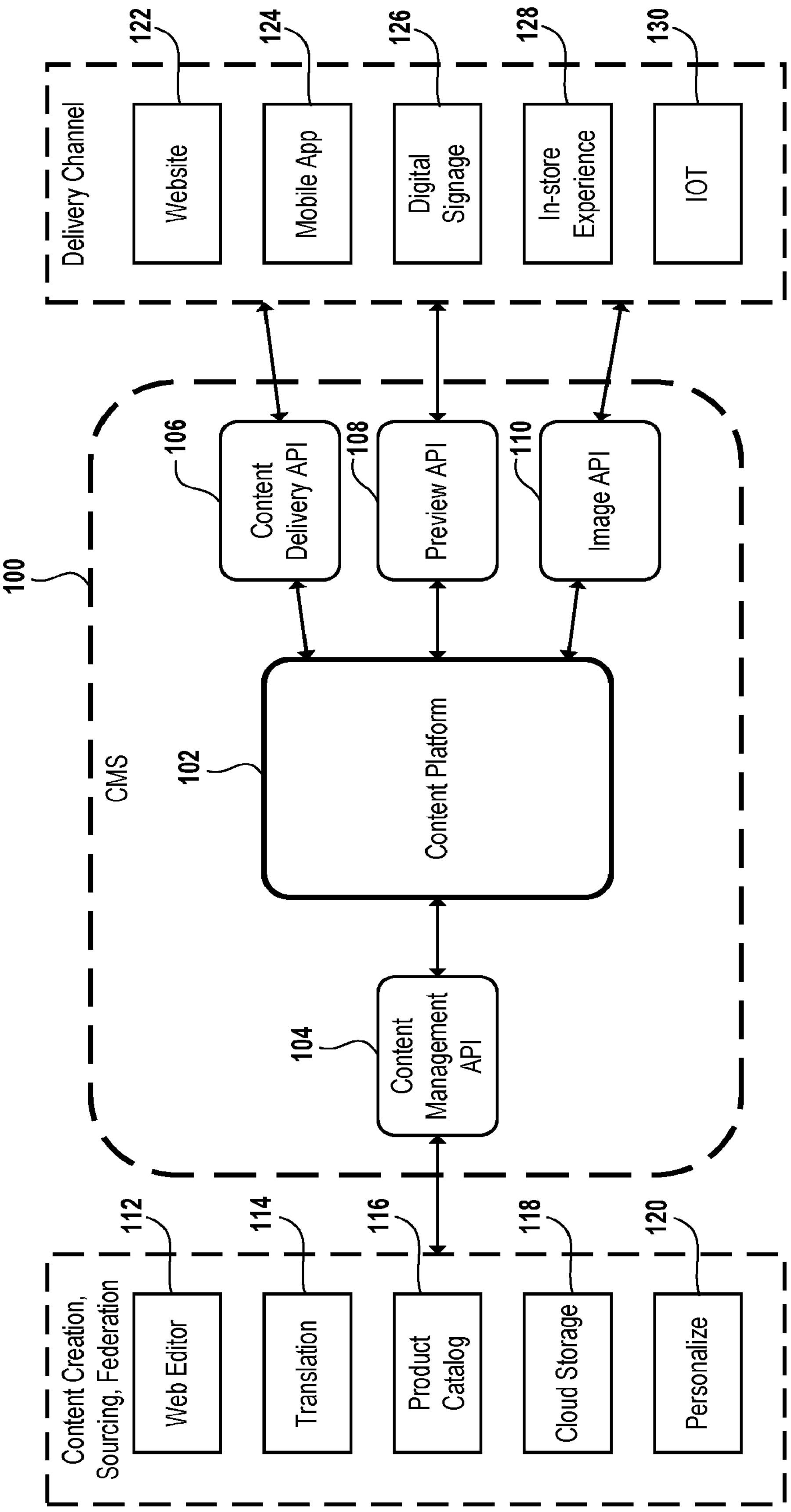
FIG. 1 conceptually illustrates a content management system (CMS) 100, and entities that interact with the CMS 100, in accordance with implementations of the disclosure.

The following implementations of the present disclosure provide methods and systems relating to providing secure access to protected or embargoed content in a content management system. It will be obvious, however, to one skilled in the art, that the present disclosure may be practiced without some or all of the specific details presently described. In other instances, well known process operations have not been described in detail in order not to unnecessarily obscure the present disclosure.

Broadly speaking, implementations of the present disclosure provide mechanisms to enable customers of a CMS to access a short-term leasing mechanism for fetching content on their own and to be able to control and provide short-term access to their end users as needed. This is also performed in such a way so as to continue to provide the benefits of the content delivery network (CDN) in terms of low latency content delivery. That is, the short-term access mechanism is principally performed at the edge, so as not to incur frequent round-trips to the CMS infrastructure. For example, if the user is fetching content from a location that is quite remote from the CMS infrastructure, requiring a round-trip back to the CMS infrastructure every single time a request is made would incur additional latency. Thus, implementations of the present disclosure provide methods and systems to validate requests at the edge without sharing very much state between the edge and the CMS infrastructure backend.

To enable this validation to be performed on every single request, implementations provide for the computation to be pushed out to the edge, and configured to be reliably performed at the edge without incurring significant latency (e.g., not more than 10 to 20 milliseconds of computational cost, or additional latency).

Some examples of assets include image files, video files, media files, binary files, etc. There are several reasons that a given CMS customer would seek to limit access to assets. For example, before being published, a customer may wish to maintain protection of assets, as they do not want such files to be accessible prior to publication. In some instances a customer such as a company may wish to restrict access to assets so that those outside of the company cannot access the assets. In some cases, access is sought to be limited to users of an intranet or local network.

Further, in addition to preventing people outside of the company from accessing content, there is the problem of terminating access to someone that should no longer be able to access the content (e.g., preventing an ex-employee from continuing to be able to access content just by knowing the URL). Thus, what is needed is a mechanism that not only provides authentication/authorization for the asset, but also ensures that if a given user knows how to access an asset, then this information is not valid for too long of a time period.

However, this is a challenge of the common solutions employed by current CMS implementations in which a token is provided to enable access to assets. For such tokens tend to enable access to all the assets of a given collection or that are associated with a customer. Further, the token tends to be long-lived, as it is valid indefinitely until the token is changed. However, as a practical matter, users are reluctant to change such a token because if changed, then it needs to be changed on all systems that are using the token. Thus, because of the difficulty, users tend not to change the token, so that it becomes less secure as time goes by, as the longer the token is in use and the more users have it, the more the assets are prone to becoming accessible outside of the scope of what they were initially meant.

Another use case wherein one may wish to publish content to a restricted audience rather than to the general public, is in the case of B2B services or other services requiring login authentication. For example, authentication may be implemented by a B2B service so that only an authenticated business customer can view particular content intended for them, but not the general public. When publishing to an authenticated audience, if a login is required for example, then ideally the content should be protected by a mechanism that is at least as secure as the login mechanism that is required to access the service's website or application.

A headless CMS provides its own authorization framework for users such as editors or translators or others having editorial level access to the content. However, a headless CMS is generally not configured to provide customer level control over access when delivering this content to end users of the customer. Thus, a challenge exists regarding how to enable customers of the CMS to integrate their own authentication with what the CMS platform provides. In keeping with the principles of a headless CMS platform, it is not desirable to dictate to the customers how they can authenticate their users for content access, but rather a solution is sought that would be open for integration with customers' preferred modes of authentication.

In view of the above, implementations of the present disclosure provide systems and methods enabling customers to request a signing key, from which they are enabled to create signed URLs. In contrast to access tokens which tend to be long-lived, the signing keys are defined for specific content groups (e.g., space) and have a limited lifespan, and the signed URLs for specific pieces of content, which are created by the customer using such signing keys, also has a limited lifespan, up to the lifespan of the signing key used to create the signed URL. Signed URLs can be validated at the edge without requiring communication back to the CMS infrastructure to determine whether a signed URL is valid, which also reduces roundtrip latency as different keys that customers generate can be validated at the edge. Broadly speaking, a chaining of signatures is implemented to enable independent validation at the edge. The CMS infrastructure shares a server secret with the edge compute, and the server secret is used to create signing keys for customers, so that customers can then create signed temporary URLs that can be given out to end users. The signed URLs are validated at the edge through a process entailing re-derivation of the signing keys, to determine whether the signed URL was correctly generated.

FIG. 1 conceptually illustrates a content management system (CMS) 100, and entities that interact with the CMS 100, in accordance with implementations of the disclosure.

Broadly speaking, a content management system (CMS) is a system that facilitates and manages the creation, storage, editing, and delivery of digital content. One example of a CMS is provided by Contentful GmbH (https://www.contentful.com). In a CMS in accordance with implementations of the disclosure, content can be distinguished from the context/channel in which such content is presented. That is, content is modularized and separated from its appearance in a given presentation context through which the content is presented and actually consumed by the end user. Examples of presentation contexts include websites, mobile apps, digital signage, in-store digital experiences, etc.

Content generally consists of content items which can be of various types. Examples of types of content items include text, images, audio, video, data values, etc. Content items are typically stored as data structures in the CMS (e.g., JSON data structures containing text, metadata, links, tags, etc.), and in some implementations, include raw text, media, or data files. Hence, content is stored and delivered in a generic format, and formatting is later applied in the end application that defines the presentation context. For example, appearance determinations such as fonts, colors, alignment, etc. are applied to text or media content items by a website or mobile app. Thus, the final appearance of content is not determined at its creation, but rather is dynamically determined by the context in which the content will appear.

Content items can be flexibly configured to enable specific content items for specific purposes to be defined. For example, the content items which comprise a typical rendering of a news article by a newspaper/publication may include the following: title of the newspaper/publication, place/location, date, copyright information, article title, subtitle, author, body, photo/image, photographer name, photo/image caption, etc. Each of these content items can be separately stored and independently delivered as needed to suit different contexts of presentation. For example, a news article appearing on a news website will be configured to present the article in a different format/style than when the same article appears in a social media feed, on a digital sign, or in another context.

Broadly speaking, the CMS 100 provides a content platform 102 to unify and structure content for improved content management and delivery. Access to and management of the content is provided through various application programming interfaces (API's). In some implementations, creation, editing, federation and other management of content is mediated through a content management API 104. In some implementations, the content management API 104 is a read-write API for managing content. In some implementations, the content management API 104 requires authentication as a user of the CMS. The content management API 104 enables one to programmatically create or update content items. It will be appreciated that the content management API 104 can be used for a variety of purposes, including by way of example without limitation, creation and editing of content in the content platform, automatic imports from other content sources/repositories, integration with other backend systems (e.g., an e-commerce shop), building custom editing experiences, etc.

For example, a web editor 112 is implemented to provide a web-based user interface for creating and editing content, the web editor accessing the content management API to generate new content items in the system, retrieve and edit existing content items, store changes to content items, etc.

In some implementations, content is localized in part by translation logic 114, which enables translation (in some implementations, causes translations) of the content into the local language of the delivery context. Thus, translation logic 114 may access the content management API 104 to retrieve, generate, and store translations of content in the CMS 100, as well as configure such translations for presentation in the appropriate contexts.

In some implementations, the content platform 102 of the CMS 100 can be integrated with other systems via the content management API 104. In some implementations, content can be sourced/mined/imported from, or synchronized with, an existing repository of content. For example, an existing product catalog 116 may be maintained including information about products such as product names, categorizations, descriptions, price information, related media, etc. and such a product catalog system can be configured to import or update content, or otherwise affect content management actions so as to integrate with the CMS 100 via the content management API 104. In some implementations, a cloud storage system 118 can similarly integrate with the CMS 100 via the content management API 104.

In some implementations, a personalization system 120 is enabled to affect content personalization via the content management API 104. Personalization information can be utilized to enable customization of content or downstream customization of content delivery. Examples of personalization information can include user demographic information (e.g., age, gender, ethnicity, etc.), geolocation, user content consumption history, user preference information, user purchase history, etc. Such personalization information can be utilized by the personalization system 120 to customize content via the content management API, and the selection and presentation of content through a given context.

As noted, content is separated from its presentation, so that the specific appearance of delivered content is determined by or otherwise based on the downstream context/channel through which the content is delivered (e.g., website, mobile app, digital signage, in-store experience, etc.). To this end, various API's are provided for enabling such presentation contexts/channels to access the CMS to obtain the appropriate content for presentation. For example, a content delivery API 106 is exposed to enable retrieval of content items and delivery of said content items to the presentation context. In some implementations, the content delivery API 106 is configured as a read-only API for delivering content from the CMS 100 to apps, websites and other media. In some implementations, content can be delivered as JSON data, and images, videos and other media as files. The content delivery API 106 can be made available via a globally distributed content delivery network (CDN), so that the server closest to the user serves all content, both JSON and binary. This minimizes latency, which especially benefits potentially bandwidth constrained delivery contexts, such as mobile apps. Hosting content in multiple global data centers also greatly improves the availability of content.

In some implementations, a content preview API 108 is provided, which is a variant of the content delivery API 106 for previewing content before delivering it to live customers. The content preview API 108 can be used in combination with a preview deployment, e.g., preview deployment of a website or a preview build of a mobile app, that allows content managers and authors to view their work in-context, as if it were published, using a preview access token as though it were delivered by the content delivery API 106.

In some implementations, images API 110 is provided, enabling image transformations/adjustments, such as resizing and cropping of images, changing their background color and converting them to different formats. Using the images API 110 for these transformations allows users to upload high-quality assets, while delivering images suitable and optimized for the delivery channel, and leveraging the benefits of a caching content delivery network.

It will be appreciated that content can be delivered from the CMS 100 to any of various delivery channels/contexts, such as a website 122, mobile app 124, digital signage 126, in-store experience 128, Internet-of-things (IOT) device 130, etc.

In some implementations, the CMS 100 is configured to have the following main entity types: user, organization, space, and environment.

A user is an entity with an account in the CMS. Users can be invited to an existing organization, or sign up individually. If a user has signed up individually, a new organization is automatically created. An existing user can create additional organizations or be invited to other existing organizations. In some implementations, users have management authentication credentials attached to them, such as OAuth applications, OAuth tokens, and personal access tokens.

An organization is an entity that serves as a way to group users and group spaces (content projects). In some implementations, the organization also links member users to a billing entity, so subscriptions and invoices are tied to the organization, rather than to a specific user.

In some implementations, the CMS implements a role-based access model. For example, users can be invited to join an organization and those users will have different levels of access based on their organizational role.

In some implementations of the CMS, a space or a content project is a child of the organization, and serves as a container for the organization's content and any settings related to that content. Spaces allow one to separate data according to the structure of projects or services.

Various settings can apply to a given space or content project. For example, users of a space can be defined as members of the parent organization who belong to the space, and their respective access roles can be defined. Roles and permissions can be defined to set user access levels within the space. API keys can be defined, so that in order to retrieve content through one of the CMS's APIs, a key has to be provided for authentication. For example, in some implementations, an API key is required to be provided in order to access published content through the content delivery API or to access unpublished content through the preview API. Webhooks can be configured to send requests (e.g., HTTP requests) triggered by changes to a content model, content, or media. Content preview functionality is supported, providing a link within the entry editor to a pre-production environment that uses the preview API to access unpublished content.

In some implementations of the CMS, environments are defined as entities within a space that allow one to create and maintain multiple versions of the space-specific data and configuration, and make changes to them in isolation. Hence, in some implementations, each space has one environment by default, which may be termed a master environment. Additionally, multiple sandbox environments can be created. These sandbox environments allow one to modify the data in a space without affecting the data in the master environment. In some implementations, an environment alias can be implemented to allow one to access and modify the data of a target environment, through a different static identifier. For example, a master alias ID can be implemented to reference or point to the environment that is deemed to be the current production version, and accordingly API calls using the master alias ID will access the referenced environment. It will be appreciated that the master alias ID can be easily switched to another environment as needed, conveniently facilitating rollout of a new version of content or rollback to a prior version.

In some implementations, environments include a content model, content, and media. The content model is a collection of content types, which define the structure of the content. The content is defined as a collection of entries. Media is defined as a collection of assets.

A plurality of settings can apply to environments. For example, in some implementations, there are locales settings to manage and deliver content in multiple languages, or otherwise customize content delivery based on delivery geolocation. In some implementations, user interface (UI) extensions are supported, to enable building of customized editing experiences for the web editor. In some implementations, app installations are supported, extending and expanding the capabilities of the CMS web application.

Figure 2:
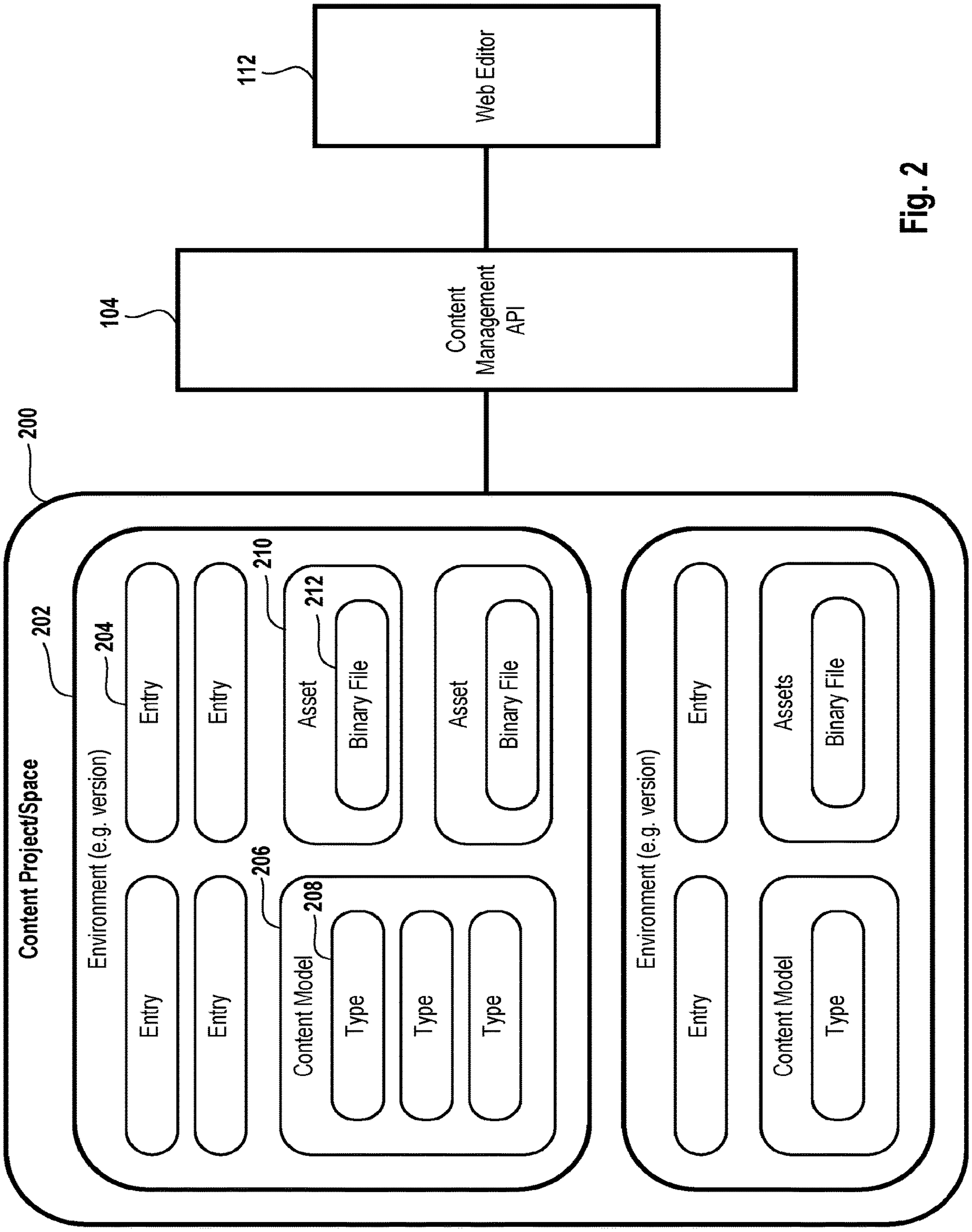
FIG. 2 conceptually illustrates a content project (also termed a space), in accordance with implementations of the disclosure.

FIG. 2 conceptually illustrates a content project (also termed a space), in accordance with implementations of the disclosure.

In the illustrated implementation, content is organized in content projects, such as an exemplary content project 200, that groups together all the related resources for a given project. This can include content entries, media assets, and settings for localizing content into different languages. Each content project has a content model that represents and defines the content types one can create for the content project.

In some implementations, all content types have standard fields that contain basic information about the content type, its fields and meta data (e.g., system properties, name of the content type, description of the content type, listing of fields, ID of main field used for display, etc.). Each content type is flexibly configurable, further consisting of user-defined fields, which in some implementations, correspond to a JSON type (e.g., string, number, object, boolean, array). Examples of user-defined fields include the following: text, number, date and time, location (coordinates), boolean, media (links to an asset), reference (links to an entry or object), array, JSON object. It will be appreciated that array fields can contain multiple values which can include strings, links to other entries or assets, etc. An array field may have an items property defining the allowed values in the array. Individual fields can also contain metadata, such as validations and widget appearance.

Individual items of content are stored in the CMS as entries (e.g., entry 204), which represent textual or structural information based on the content type used. Items can also be assets (e.g., asset 210), which can include binary files (e.g., binary file 212), such as images, videos or documents, along with metadata. In some implementations, assets have the following fields: the name, description and attached file.

In summary, a content project contains all the content that is functional to one project, and an environment is a way to express one version of one project. An example use case for multiple environments as part of a given content project would be a scenario in which there is a current version of one's website and a future holiday version of the website that is not in production yet, but being worked on. There can be a first environment that contains the content for the current version being actively served to customers, while in parallel work is proceeding on a second environment which is for the future holiday version to be released.

Further, content in a given environment of a content project consists of entries and assets, with each entry being of a user-defined type that specifies the fields of a given entry. Thus, each entry is a unit of content in the system of a type that is flexibly defined by the user and capable of being adapted to suit a given purpose.

For purposes of illustration, an example of a content model for a product catalogue might include content types for a category (identifying what product type), a brand (identifying who made the product), and a product (an item for sale that references a category and a brand). Further, the brand content type might consist of several fields, such as a company name, logo, description, electronic contact information (website, social media, email address), phone number, etc.

Entries can have link (or reference) fields which point to other entries or assets. An example use case for a restaurant might include the following: a restaurant linking to its menu (singular relationship), a menu linking to its specific menu items (plural relationship), each menu item linking to a photo (attachment), a restaurant linking to multiple photos (attachments). The content delivery API can be structured so that a single HTTP request retrieves the entire set of linked resources above, starting with the menu, in one request. A CDN can cache these requests to further speed up future requests. This is useful for consuming apps (and especially mobile apps) as it reduces the need for multiple concurrent connections or servicing of serially dependent requests, and reduces the latency for results to return.

Links also provide additional advantages in that relationships are clearly defined and validated by specific content type fields. Entry links can be validated by content type (e.g., only allow Menu Items for fields.menuItems). Asset links can be validated by file type. (e.g., only allow Images for fields.photo). Links on the Content Delivery API are resolved using the published entries and assets, while links on the Content Preview API will resolve using the draft entries and assets.

Figure 3:
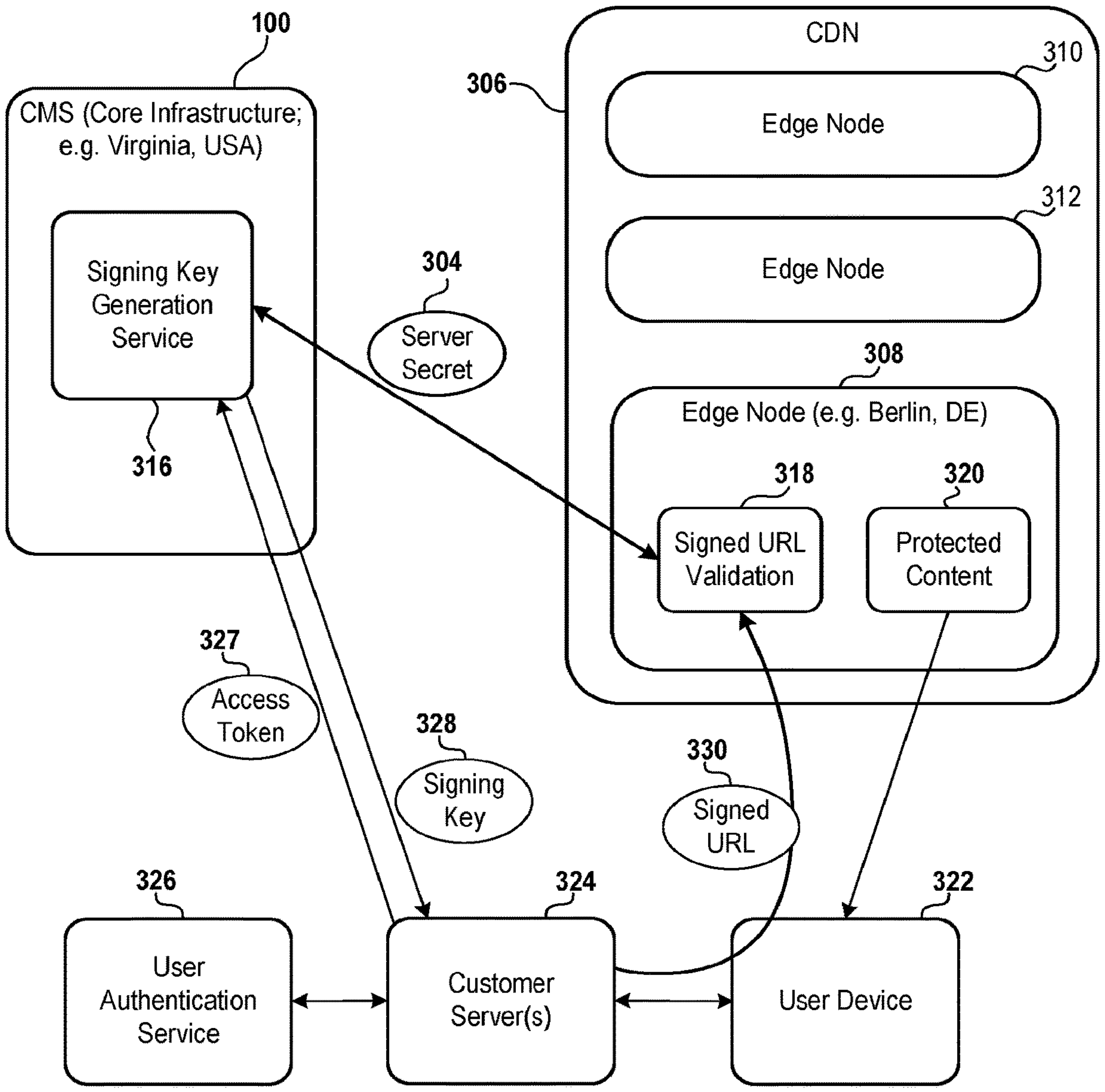
FIG. 3 conceptually illustrates a system for providing authenticated access to content of a CMS, in accordance with implementations of the disclosure.

FIG. 3 conceptually illustrates a system for providing secure access to protected content of a CMS, in accordance with implementations of the disclosure.

The CMS 100 provides a platform for editing and managing content. However, to facilitate faster delivery of content to customer end users, the content is mirrored and delivered through a global content delivery network (CDN) 306. The CDN 306 consists of a number of edge nodes 308, 310, 312, etc. which are distributed at various locations throughout the world to enable faster serving of content to local regions proximate to the edge nodes. Each edge node includes edge compute and storage resources for enabling caching of content and servicing of requests for content. The edge compute resources can be further configured to implement logical services for enabling secure access to protected content at the edge, in accordance with implementations of the disclosure.

A customer of the CMS 100 typically uses an access token to authenticate and access the CMS 100 for editorial purposes. This type of authentication setup is generally suitable for editorial purposes to access the functionality provided by the core infrastructure of the CMS 100, and so the customer communicates with the CMS 100 to authenticate in the system. However, in the case of end users of the customer, to whom the customer provides content managed via the CMS 100, the content is delivered from the CDN 306 to enhance the user experience, and it would be inefficient to require communication back to the CMS 100 in order to properly authenticate or validate the end users' requests.

In a typical setup, an end user operating a user device 322 accesses the customer server 324, for example, to obtain a webpage or other content delivery context. The customer server 324 returns the webpage, which includes links or URLs to component content pieces of the webpage, such as assets/entries or other types of content. These URLs point to assets/entries which are cached at an edge node of the CDN 306, so that the user device 322 can obtain content for the webpage from the CDN 306. In some implementations, the customer server 324 may return a redirect to the CDN for the assets/entries of the webpage. It will be appreciated that the CDN 306 speeds roundtrip time by caching content at the edge, nearer to the end users, for an improved end user experience.

For purposes of illustration only, consider a scenario wherein the CMS 100 core infrastructure is located in Virginia, USA, and the end user is in Berlin, Germany, and therefore the user device 322 retrieves content from a proximate edge node 308 that is also in Berlin. If access to an asset employed an authentication/authorization mechanism requiring communication back to the CMS 100 in Virginia each time the asset was requested in order to check if the request is valid in accordance with the authorization set for the given asset, then this would add considerable latency, network traffic, and require the CMS infrastructure to scale with the customer's users. Thus, it is challenging to enable validation at the edge nodes of the CDN 306, which normally simply distribute cached content, actually calculate if the authentication is valid. It is a further challenge to implement a system at the edge that will invalidate access after the right time so that such access is not continuous and also without requiring the edge node to possess too much knowledge about the CMS 100 system itself.

With continued reference to FIG. 3, a digital signing chain is implemented to enable validation of requests for content at the edge. The CMS 100 implements a signing key generation service 316 that shares a server secret 304 with a signed URL validation service 318 of the edge node 308. The server secret 304 can be a 128 bit string in some implementations, by way of example without limitation. It will be noted that the server secret 304 is shared between the CMS 100 and the edge node 308, but not shared beyond the edge with any customer or user.

To obtain a signing key enabling the customer to create signed URLs, the customer server 324 requests a signing key from the CMS 100. More specifically, the customer server 324 authenticates using its access token 327, and requests a signing key from the signing key generation service 316. In response, the signing key generation service 316 of the CMS 100 uses the server secret 304 to generate the signing key 328 that is provided to the customer server 324. (Though a single customer server 324 is described for purposes of ease of explanation, it will be appreciated that the functionality attributed to the customer server 324 can be defined across one or more servers in various implementations.)

In some implementations, the signing key generation service 316 defines an endpoint of an API of the CMS 100, such as the content delivery API, content management API, or content preview API of the CMS 100.

A user operating the user device 322 to access the customer server 324 may be authenticated through a user authentication service 326, which is the chosen mode of authentication for the customer, and with which the CMS 100 does not interface. By way of example without limitation, the user may be required to login to, or otherwise demonstrate authorization to access, the customer's platform/services via the user authentication service 326. It will be appreciated that the CMS 100 and the CDN 306 need not possess knowledge of the customer's authentication service 326. In some implementations, the user authentication service 326 can be integrated with the customer server 324, or can be a 3rd party service in some implementations.

When the user device 322 requests content from the customer server 324, and the customer server 324 determines that the user is authorized to obtain the content, then the customer server 324 uses the signing key 328 to generate a signed URL 330. The signed URL 330 can be shared with the user device 322, in some implementations as a redirect, to enable the user device 322 to retrieve the content identified by the signed URL 330 from the edge node 308. At the edge node 308, the signed URL is validated by a URL validation service 318, which can be based on rederiving the signing key 328 (or more specifically, a signing secret as described in further detail below) based on the server secret 304 and the signed URL 330, to ensure that the signed URL 330 is correctly signed by an entity that would have received the signing key 328. In response to successful validation of the signed URL 330, then the identified content, stored/cached as protected content 320 at the edge node 308, is returned to the user device 322.

Figure 4:
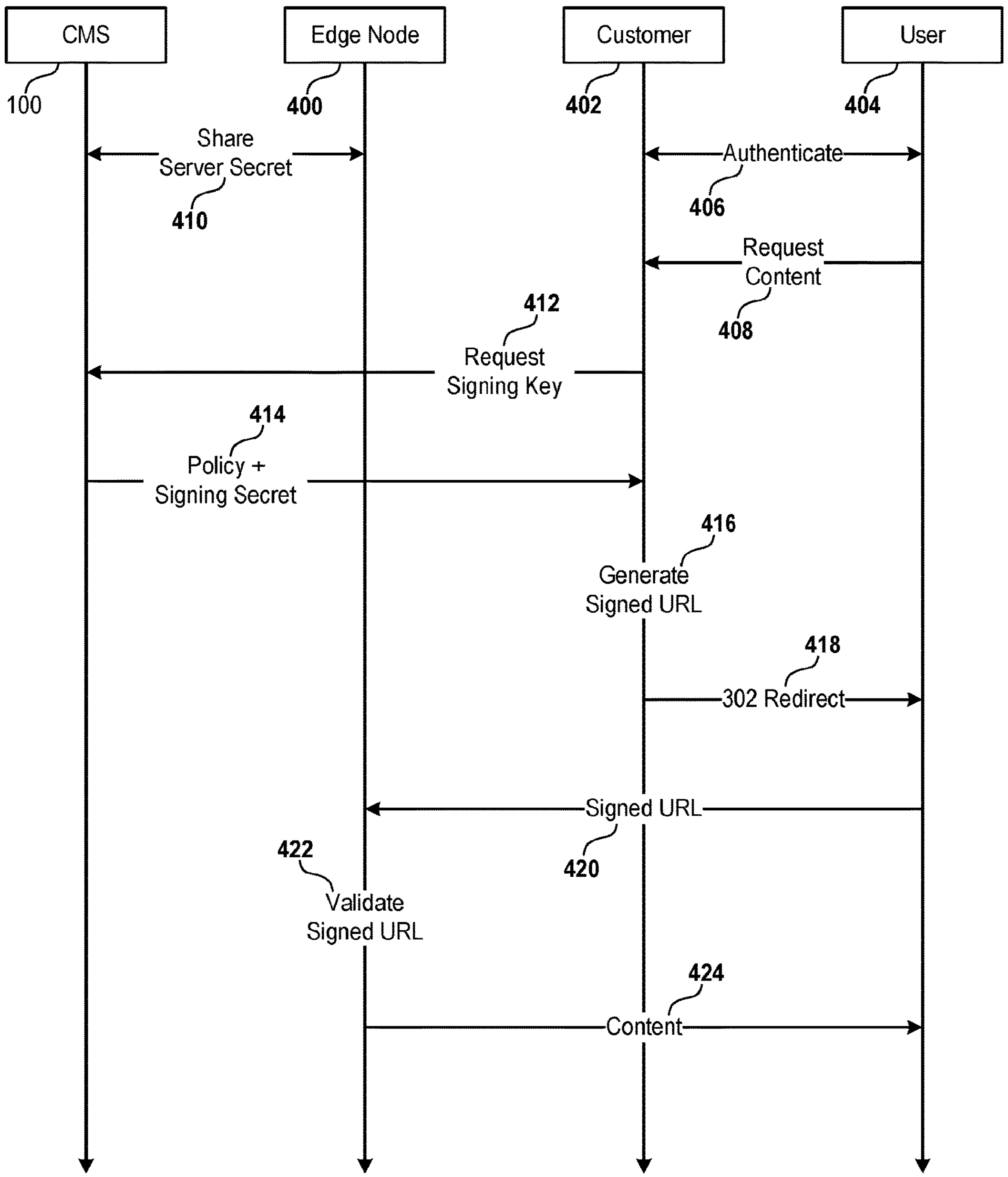
FIG. 4 conceptually illustrates a method for enabling authenticated access to embargoed content of a CMS, in accordance with implementations of the disclosure.

FIG. 4 conceptually illustrates a method for enabling secure access to protected/embargoed content of a CMS, in accordance with implementations of the disclosure.

In the illustrated implementation, operations between a CMS 100, an edge node 400, a customer 402 of the CMS (or the customer's system/server), and an end user 404 of the customer (or the user's system/device) are conceptually illustrated over time based on interactions. At method operation 406, the user 404 authenticates with the customer 402, such as by logging in, through a browser cookie, or other customer established authentication system, software, process and/or process. In this way, the customer 402 identifies the user 404 as an authorized user with access to specific content managed by the customer 402 using the CMS. At method operation 408, the user 404 requests certain content 408 from the customer 402. In some implementations, the requested content is a webpage or an asset or component of a webpage. In other implementations, the requested content can be any type of content belonging to the customer, and managed through the CMS, that is subject to an embargo or restriction on access as defined by the customer.

At method operation 410, the CMS 100 and the edge node 400 share a server secret. In some implementations, the server secret is generated at the CMS 100, and the edge node 400 receives the server secret from the CMS. In some implementations, the server secret is periodically changed/rotated and shared anew between the CMS and the edge node.

Responsive to receiving the request for content from the user at operation 408, then the customer 402 may determine whether the user is authorized to access the requested content. If so, then the customer 402 either retrieves a cached signing key, or obtains a new signing key if one is not already cached. At operation 412, to obtain a new signing key, the customer 402 initiates a request to the CMS 100 for a signing key. In response, the CMS 100 uses the server secret to generate a signing key that is returned to the customer 402 at operation 414. In some implementations, the signing key consists of a policy and a signing secret that is created by signing the policy using the server secret. Broadly speaking, the policy specifies the collection of content (e.g., a space or environment; published content, unpublished content, etc.) accessible using the signing key, and the duration for which the signing key is valid, such as an expiration time for the signing key.

At method operation 416, the customer uses the signing key to generate a signed URL for the requested content. In some implementations, the signed URL is generated by affixing to the URL of the requested content, both the policy of the signing key, and a signed payload that is signed using the signing secret of the signing key. It should be noted that the signing secret is never to be shared with the end user or affixed to the signed URL.

The signed URL is provided to the user 404 at operation 418. In some implementations, the signed URL is provided in the form of a redirect 302, redirecting the user's original request for content from the customer to the edge node 400, using the signed URL. As indicated at operation 420, the signed URL 420 is provided from the user 404 to the edge node 400.

At method operation 422, the signed URL is validated by the edge node 400. In some implementations, the validation includes rederiving the signing secret at the edge node 400 using the policy included in the signed URL and the server secret, and the rederived signing secret is used to validate the signed payload.

Upon successful validation of the signed URL, then at method operation 424, the content requested by the user is returned to the user 404.

Figure 5:
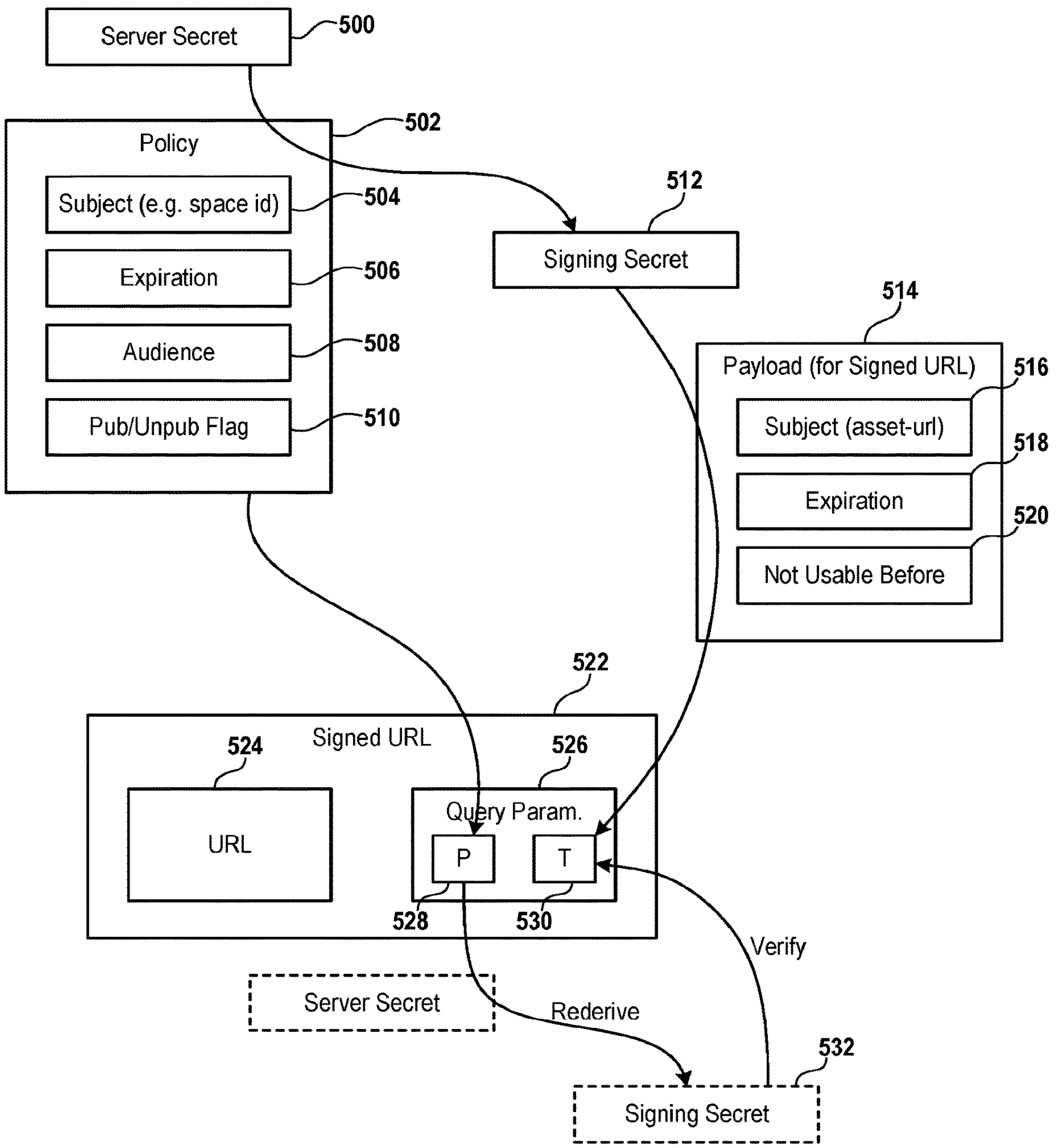
FIG. 5 conceptually illustrates the generation and validation of a signed URL, in accordance with implementations of the disclosure.

FIG. 5 conceptually illustrates the generation and validation of a signed URL, in accordance with implementations of the disclosure.

As shown in the illustrated implementation, a server secret 500 is shared between the CMS core infrastructure and the edge node. This server secret 500 is not shared beyond the edge node with either a customer or user. In some implementations, the server secret 500 is a string (e.g., 128-bit string). In some implementations, the server secret 500 is generated at the CMS, and consumed/used by the signing key generation service of the CMS as well as the validation logic of the edge node.

As has been described, a customer may request a signing key from the CMS, to enable the customer to create signed URLs that can be provided to users. In some implementations, the request for the signing key accesses an API of the CMS. In some implementations, the request for the signing key is accessed through an API endpoint of the content delivery API, content management API, or content preview API. The request identifies the content collection that the signing key is being requested for, such as the assets or other types of content in a specific space or environment. In some implementations, the request also specifies an expiration time or duration of validity for the signing key. In some implementations, a maximum duration is defined for a signing key, such as a maximum of 24 hours, 48 hours, 72 hours, one week, etc. The requesting customer will have access via their access token to the signing key generation service to generate a signing key for a given content collection.

A valid request for the signing key will return a signing key consisting of a policy 502 and a signing secret 512. In some implementations, the policy 502 includes a subject 504 identifying the content collection for which the signing key is to be used to enable access, such as the space ID or environment ID in some implementations. In some implementations, the policy 502 includes an expiration time 506 that sets the time at which the signing key will expire. In some implementations, the policy 502 includes an audience 508, which identifies the audience for signed URLs generated from the signing key, such as the content delivery network. In some implementations, the policy 502 includes a flag 510 indicating whether the policy can be used to fetch published or unpublished assets. The policy 502 is signed with the server secret to generate the signing secret 512.

In some implementations, the policy 502 and the signing secret 512 together define the signing key that is returned to the customer. The customer can use the signing key to generate signed URLs to access content/assets within, for example, the content collection (e.g., space id) specified in the policy of the signing key.

To create a signed URL 522, the customer first generates a payload consisting of the URL of the content/asset for which the signed URL is being created, and optionally an expiration time 518 of the signed URL, and optionally a not-useable before time 520. The payload 514 is signed using the signing secret 512, creating a signed token 530. In some implementations, the signed token 530 is implemented as a JSON Web Token (JWT).

The customer then affixes the policy 528 and the signed token 530 as query parameters 526 to the URL 524 of the content/asset they wish to be signed. The resulting URL is signed and valid for its lifespan (as defined by the expiration and/or not-useable before time), and can only be used to access the specific signed URL. This makes the URL suitable for returning as a 302 redirect or embedding directly into a document without the risk of leaking access to all of the content/assets within a space.

When the signed URL 522 request is received at the edge node, it is validated. The provided signed token 526 is validated by rederiving the signing secret 532 that the signing key generation endpoint would have sent to the customer, given the policy document 528. It is then determined if the signed token was signed with the rederived secret, and if so, then the policy is authentic and the signed token was signed by an entity (the customer) who had access to a server-generated signing secret matching the policy.

Assuming a match of the rederived signing secret, then in some implementations, certain additional verifications are performed. In some implementations, this can include the following: verifying that the policy's audience is the content/asset delivery network of which the edge node is a part; verifying that the policy's subject matches the space in the URL; verifying that the signed token's subject matches the URL (after removing the token and policy query parameters); verifying that the present time is greater than the token's not-usable before attribute, if set; verifying that the present time is less than or equal to the minimum of the policy's expiration and the token's expiration (if set); verifying that the content/asset's publication status matches that of the pub/unpub flag.

If all of these verifications are passed, then the request is authorized.

Figure 6:
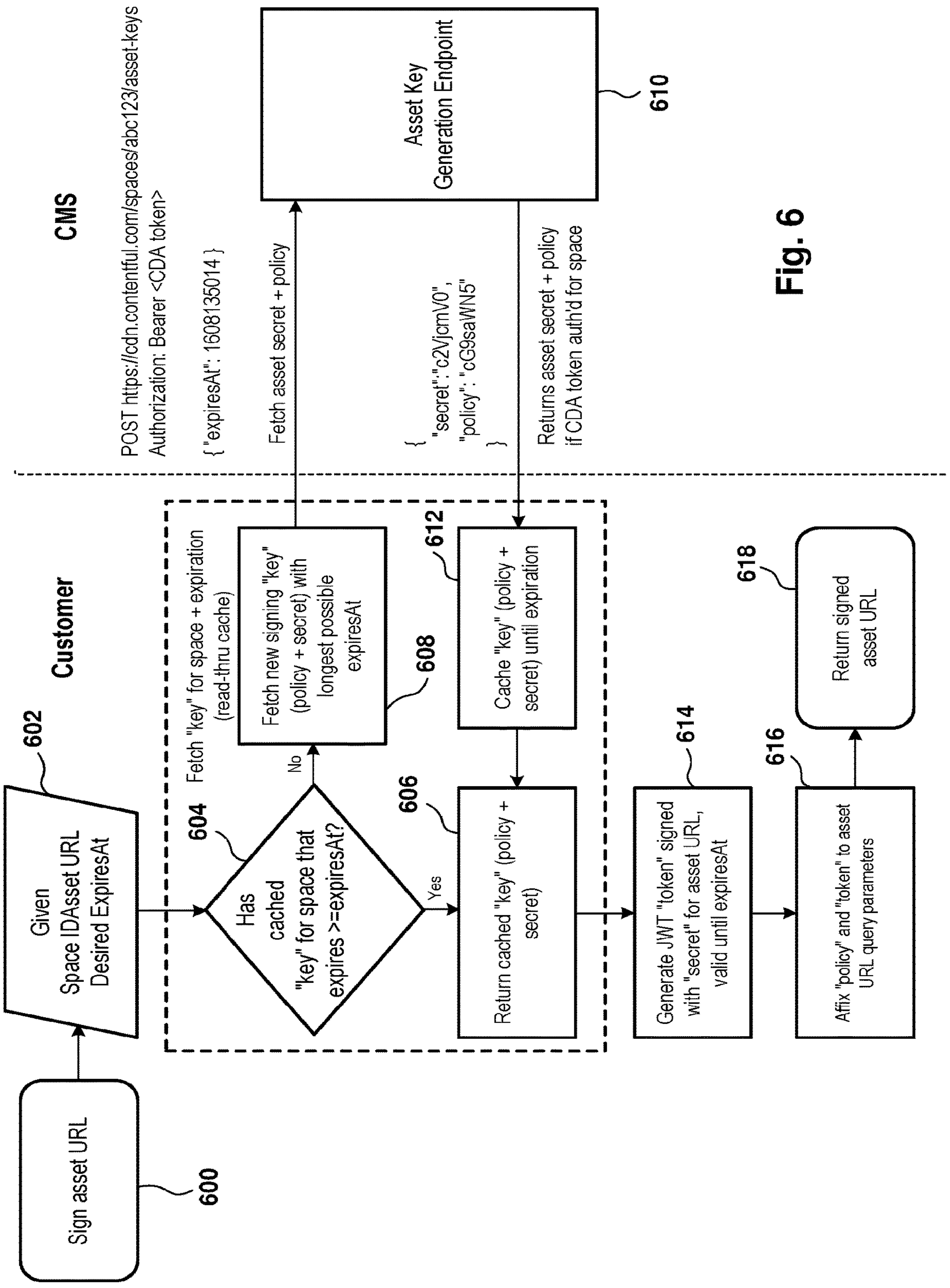
FIG. 6 conceptually illustrates a method for generating a signed URL for an asset of a CMS, in accordance with implementations of the disclosure.

FIG. 6 conceptually illustrates a method for generating a signed URL for an asset of a CMS, in accordance with implementations of the disclosure.

The method initiates at method operation 600 with an instruction to sign an asset URL, initiated by a customer of the CMS, and given parameters 602 defining the space ID, the asset URL, and the desired expiration time for the signed URL. At method operation 604 it is determined if a cached signing key for the space has an expiration time that is later than the desired expiration time for the signed URL. If so, then at method operation 606 the cached signing key is returned for use. If the cached key will expire prior to the desired expiration time for the signed URL, then at operation 608 the customer fetches a new signing key, by accessing an signing/asset key generation endpoint 610 of an API of the CMS. If the customer's access token is authorized for the space, then the CMS returns a new signing key consisting of a policy and signing secret. At method operation 612, the new signing key is cached.

At method operation 614, a JWT signing token is generated. At method operation 616, the policy and the signing token are affixed to the asset URL as query parameters to form the signed asset URL. At method operation 618, the signed asset URL is returned.

Figure 7:
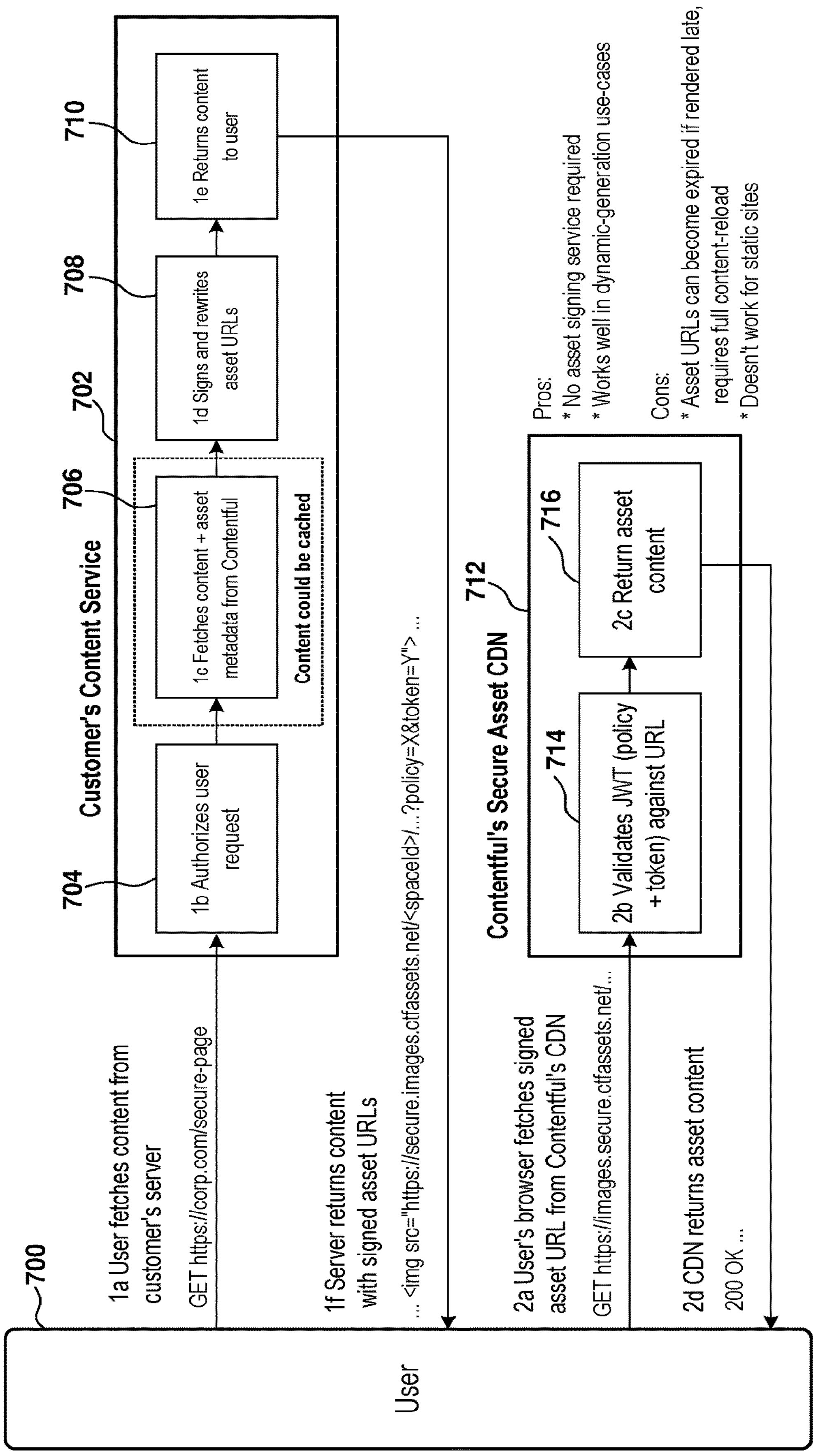
FIG. 7 conceptually illustrates a system and process flow in which a customer content service rewrites asset URLs, in accordance with implementations of the disclosure.

FIG. 7 conceptually illustrates a system and process flow in which a customer content service rewrites asset URLs, in accordance with implementations of the disclosure.

A user 700 initiates a request to fetch content from a customer server. At method operation 704, the customer's content service 702 authorizes the request, possibly via an authorization service. At method operation 706, the customer's content service 702 fetches content and asset metadata from the CMS. At method operation 708, the customer's content service 702 signs and rewrites asset URLs. At method operation 710, customer's content service 702 returns the content, with the signed asset URLs, to the user 700.

Upon receiving the signed asset URLs, the user's browser fetches the signed asset URL from the CMS's CDN. At method operation 714, the CMS's secure asset CDN 712 validates the policy and signing token against the URL. At method operation 716, the secure asset CDN 712 returns the asset content to the user 700.

Figure 8:
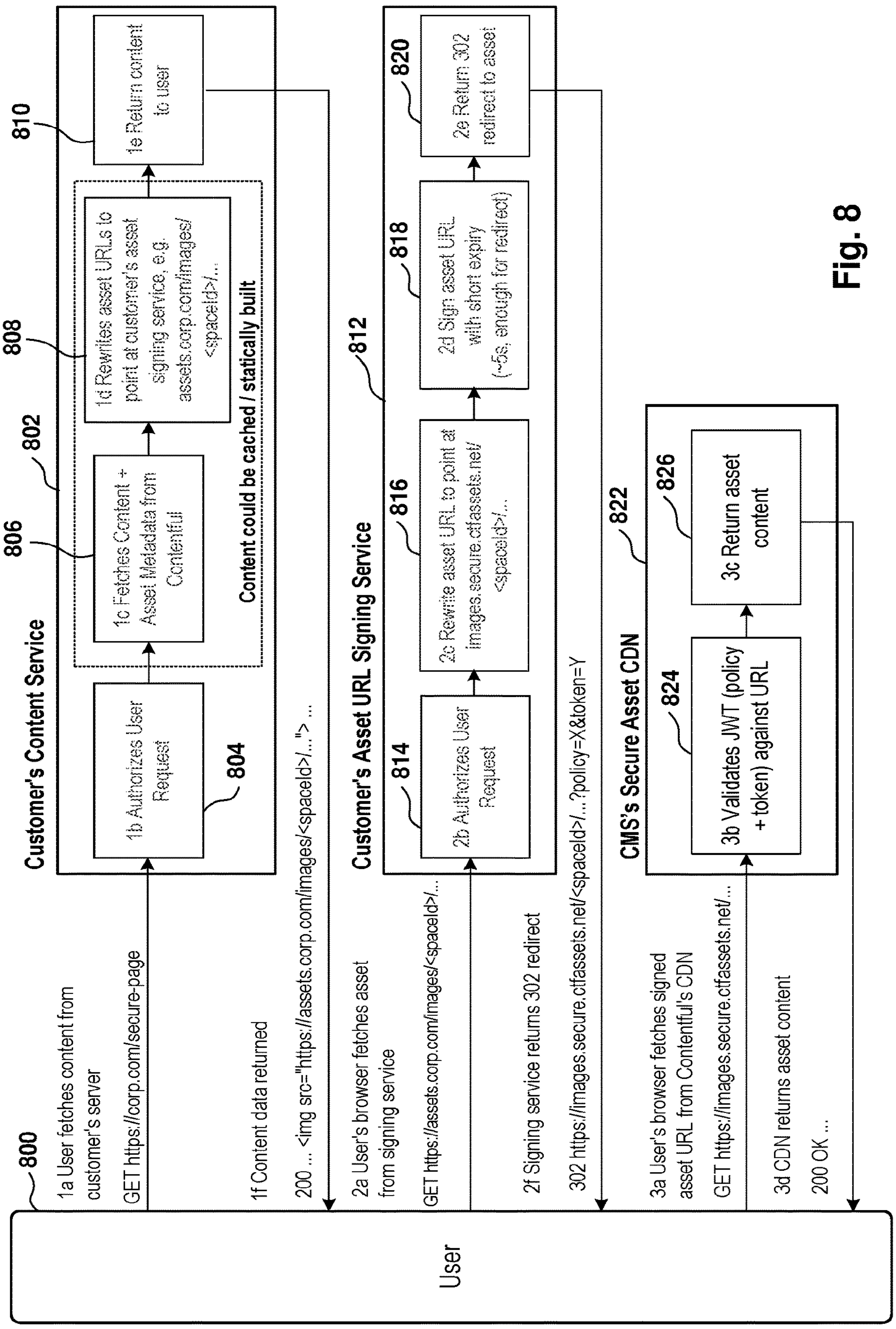
FIG. 8 conceptually illustrates a system and process flow in which a customer content service rewrites asset URLs to point at a separate customer asset signing service, in accordance with implementations of the disclosure.

FIG. 8 conceptually illustrates a system and process flow in which a customer content service rewrites asset URLs to point at a separate customer asset signing service, in accordance with implementations of the disclosure.

In the illustrated implementation, a user 800 initiates an operation to fetch content from a customer content service 802. At method operation 804, the customer content service 802 authorizes the user request, in some implementations, via a separate authorization service. At method operation 806, the customer content service 802 fetches content and asset metadata from the CMS. Then at method operation 808, the customer content service 802 rewrites the asset URLs to point at the customer asset signing service 812. In some implementations, this can entail a predefined transformation that preserves the information embedded in the URL structure in some implementations. At method operation 810, the customer content service 802 returns the content to the user 800.

It will be appreciated that the returned content now includes asset URLs that point to the customer asset signing service 812. Thus, the user's browser fetches these assets from the signing service, initiating a process at the customer asset signing service 812. At method operation 814, the customer asset signing service 812 authorizes the request for a given asset, which in some implementations, may entail calling the authorization service. At method operation 816, the customer asset signing service 812 rewrites the asset URL to point at the secure address location of the asset as defined by the CMS. In some implementations, this can entail a predefined transformation of the asset URL that changes the domain to that of the secure address location. At method operation 818, the customer asset signing service 812 signs the rewritten asset URL, using the signing process as previously described. And at method operation 820, a 302 redirect to the signed asset URL is returned to the user 800.

Upon receipt of the redirect to the signed URL, then the user's browser fetches the signed asset URL from the CMS's CDN 822. At method operation 824, the CDN 822 (or an edge node of the CDN) validates the signed URL as described above. And then at method operation 826, the CDN 822 returns the asset content to the user 800.

While secure access to protected/embargoed assets has been specifically described, it will be appreciated that the principles of the present disclosure can apply equally to other types of content of a CMS. The digital signing and validation scheme of the present disclosure as applied to assets enables protection of asset files against unauthorized access. In some implementations, asset files served by the CMS are available to anyone who has an asset's URL; an access token is not required. While this is suitable for many CMS customers because such URLs are random and infeasible to guess, this is not always the case. Protection of assets implements services as described herein such that the asset URLs are protected with an additional layer of security, requiring a cryptographic signature in order to successfully fetch an asset file. The ability to control access to specific assets individually allows improved use of the CMS to serve a variety of situations, such as intranet portals, extranet portals, product launches and campaigns, paywalled content, etc.

In some implementations, when an asset is uploaded to the CMS, the asset file is stored and assigned a unique random URL. Future requests to retrieve asset metadata from the CMS's Delivery, Management, or Preview APIs will return this asset URL. Although this URL is randomly generated and generally infeasible to guess, if this URL is leaked (by accident or intentionally) it can be used to access the asset file directly without any authentication. In other words, there is no access control when fetching an asset file except for the difficulty of guessing the asset URL. This may be suitable for many CMS customers and use-cases. However, some customers and use-cases require stronger security guarantees. For example, customers who have highly sensitive product launches, who want to launch an intranet site built on the CMS, or who wish to restrict access to paywalled content may require strict access control through implementation of embargoed assets.

In some implementations, in the absence of implementation of embargoed assets, asset files are available on a public assets CDN with no authorization. Whereas when assets for a space are embargoed, the assets are no longer available on the CMS's public asset domains (e.g., images.ctfassets.net). Instead, when retrieving asset metadata from the Delivery, Management, or Preview APIs, the asset URLs will point to embargoed asset domains (e.g., images.secure.ctfassets.net).

If one attempts to access these asset URLs directly, the request will be immediately rejected. As described herein, for a request to succeed, the URLs are cryptographically signed with a signing secret shared between the customer and the CDN. In some implementations, this signature is affixed as a query parameter to the URL, is time-limited (e.g., up to 48 hours), and grants access to a single URL alone. This allows the customer to share signed asset URLs with end users without fear of leaking access to every asset in a space. In contrast, the CMS's API access tokens may grant much broader access to a space's contents, which makes them unsuitable for controlling access to individual assets.

In some implementations, several services can be implemented by the CMS customer, which can be distinct applications or integrated in part or in whole. An identity provider service is responsible for logging in the customer's end-users and assigning them an authenticated session, for example using browser cookies.

An authorization service authorizes requests from authenticated end-users for content and assets.

A content service authorizes requests using the authorization service, fetches and compiles content from the CMS's Content Delivery API, rewrites the asset URLs returned by the CMS's Content Delivery API to point to the customer's asset service before returning them to the requesting user.

An asset service authorizes user requests using the authorization service, rewrites asset URLs back into CMS asset URLs, and then cryptographically signs those URLs with a short expiry. The asset service either returns an HTTP 302 redirect to the signed URL or fully proxies the request to the CMS.

A description of a typical request flow is now provided for a user's browser downloading a webpage and related assets that a customer wishes to expose only to authorized users. Given the above service setup, then first, end-users sign into the customer website. This capability is provided by the identity provider service and persisted as an authenticated session in the user's browser by way of a browser cookie. Once logged in, the user's authenticated session will be sent as a cookie with every request. When the user requests content from the content service, it will check with the authorization service to determine if the current user is allowed to view that content. If the user is authorized, the content is fetched from the CMS. However, at this moment the content service rewrites any asset URLs to point to the asset service before returning them to the user.

By way of example without limitation, the asset service may rewrite the following embargoed asset URL:

https://images.secure.ctfassets.net/<spaceId>/<assetId>/<random>/image.png

The rewritten asset URL will point to the asset service of the customer:

https://assets.mycorp.com/images/<spaceId>/<assetId>/<random>/image.png

As part of rendering a webpage, the user's browser will request the content (as HTML) and subsequently attempt to download other assets such as images and videos. These will be fetched using the rewritten URLs pointing at the asset service. The asset service will authorize the request for any given asset using the authorization service. If authorized, the asset service will rewrite the incoming URL back to its original embargoed asset URL. It will then sign the URL with a short expiry, then return an HTTP 302 redirect to the signed URL to the user.

Upon receiving this redirect the user's browser will then attempt to fetch the signed asset URL from the CMS's asset servers (on the CDN). The CMS's servers will check that the incoming URL is correctly signed and not yet expired before sending the asset file back to the user.

A given customer's site may have millions of users, hundreds of roles, and arbitrarily complex authorization logic guarding individual pieces of content. Thus a customer running a site with access-control needs may already have such an authorization service in place. Rather than requiring the customer to fit their end-user authorization logic into a system of the CMS, implementations of the present disclosure enable the customer to use their own authorization layer in front of embargoed assets. The ability to sign URLs individually allows the customer to control access on a per-asset basis.

It will be appreciated that signed URLs are configured to be short-lived, with an expiry of seconds (and a limit of, e.g., 48 hours). This is enough time for a user's browser to follow a redirect, or for some asynchronous task to fetch a URL, but not enough time to store and use the URLs for any arbitrary period of time. By rewriting asset URLs to point at the asset service, those rewritten URLs can continue to be valid, as an authorized request to the asset service will return a redirect to a new, valid signed URL.

This can be important in a situation where the customer site lazy-loads images as a user scrolls down the page. If the user leaves a page open in their browser for a few days, it's possible when they come back and scroll down that the signed URLs will no longer be valid, and the lazy-loaded images are now broken. With non-expiring URLs pointing at the asset service then the images will continue to function.

Thus, by implementing rewriting of asset URLs as described, a customer may still rely upon the CMS's global asset delivery network to cache and deliver assets to end users. The customer does not need to worry about fully proxying requests to the CMS in order to ensure the privacy of their Delivery API access token, because any accidentally leaked signed asset URL would have a limited lifetime (e.g., seconds).

Accordingly, implementations of the present disclosure provide solutions to enable integration with customers' preferred modes of authentication. The signing mechanism enables content/asset specific access to be provided in a controlled fashion for a limited lifetime. Customers of the CMS are enabled to provide access themselves without requiring communication to the CMS for every single asset link they want to create. Customers can communicate periodically, e.g., once every 48 hours, to obtain the signing key to use to sign for assets in a given space. This allows easier scaling as network communication is greatly reduced. Signed URLs are created by the customers for their end users and those signed URLs can live up to the lifespan of the original signing key. It will be appreciated that the lifespan of the URL is not necessarily the same as, and is typically shorter than, the lifespan of the signing key.

The signed URL mechanism is very efficient, because the CDN which already caches the asset is enabled to perform the authentication of the signed URL. Hence the time to access the asset is the minimum theoretically possible because the authentication is resolved at the edge in the same place from which the file is retrieved.

Figure 9:
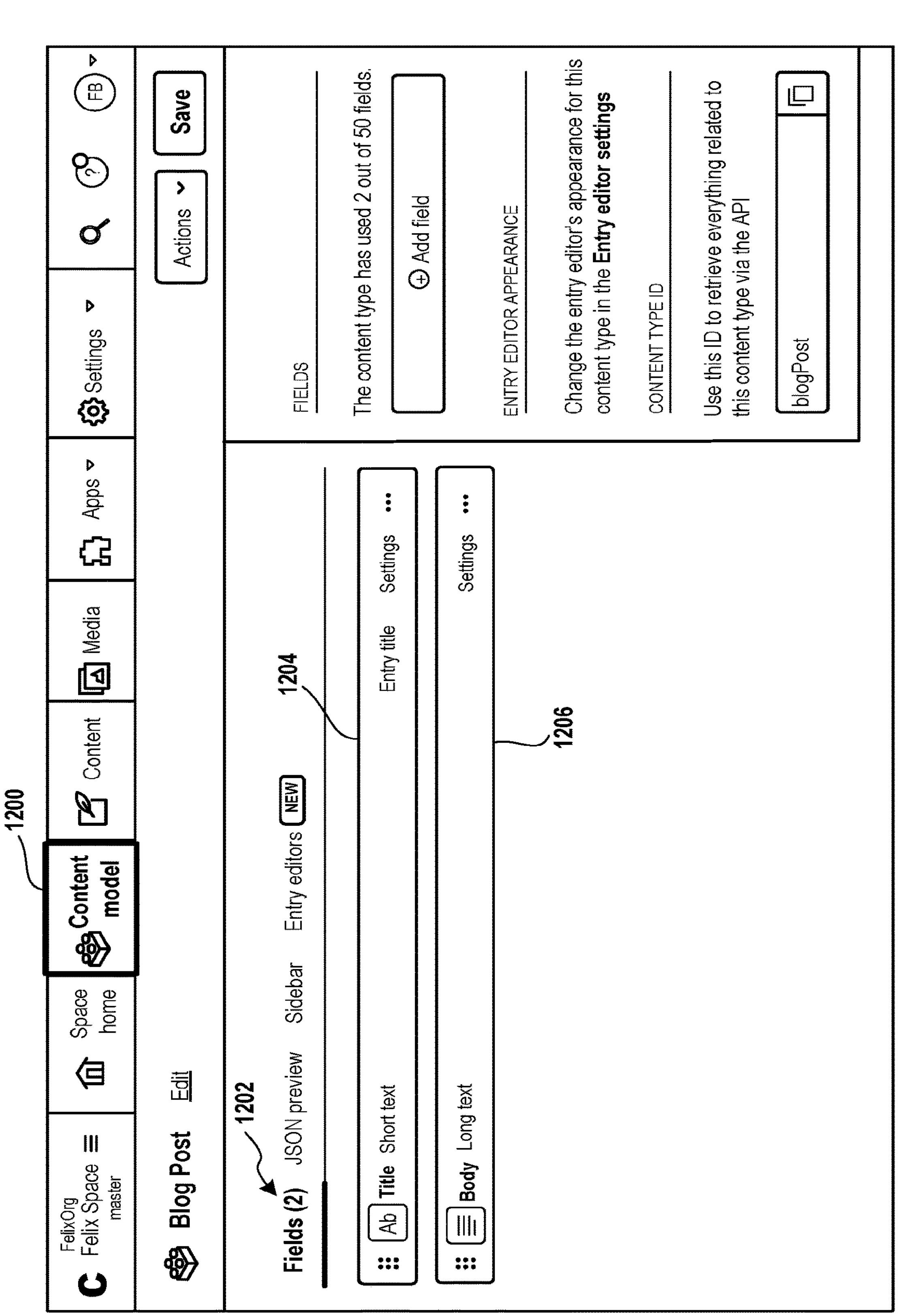
FIG. 9 illustrates an interface view of a Content model tab 1100 of a CMS editorial application, in accordance with implementations of the disclosure.

FIG. 9 illustrates an interface view of a Content model tab 1200 of a CMS editorial application, in accordance with implementations of the disclosure.

In the illustrated implementation, a view of a "Blog Post" type is shown, with the Fields 1202 of the type being currently displayed. As shown, the "Blog Post" type includes a Title field 1204 and a Body field 1206.

FIG. 10 illustrates an interface view of a Content tab 1300 of a CMS editorial application, in accordance with implementations of the disclosure.

In the illustrated implementation, a listing of content entries 1302 for a given space environment is shown, including the name, the date the entry was last updated, the author, and the status (e.g., published, unpublished, etc.). The listing of content entries can be filtered by content type, or searched. A listing of content types 1304 is also shown.

FIG. 11 illustrates an interface view of an entry editor of a CMS editorial application for adding a new entry to a content project/environment, in accordance with implementations of the disclosure.

In the illustrated implementation, the entry being edited is of a "Help Center—Article" type, and accordingly has certain predefined fields which are fillable/editable to compose the entry. As shown, these fields include a Title field 1400, Slug field 1402, Preview Description field 1404, and Content field 1406, which are editable via the illustrated text entry boxes.

FIG. 12 illustrates an interface view of a Media tab 1500 of a CMS editorial application, in accordance with implementations of the disclosure.

In the illustrated implementation, a listing of assets 1502 is shown, including various information displays such as a preview thumbnail, name, dimensions, type, when the asset was last updated, by whom, and status. Various file types are supported, including attachment, plain text, image, audio, video, and rich text.

Figure 13:
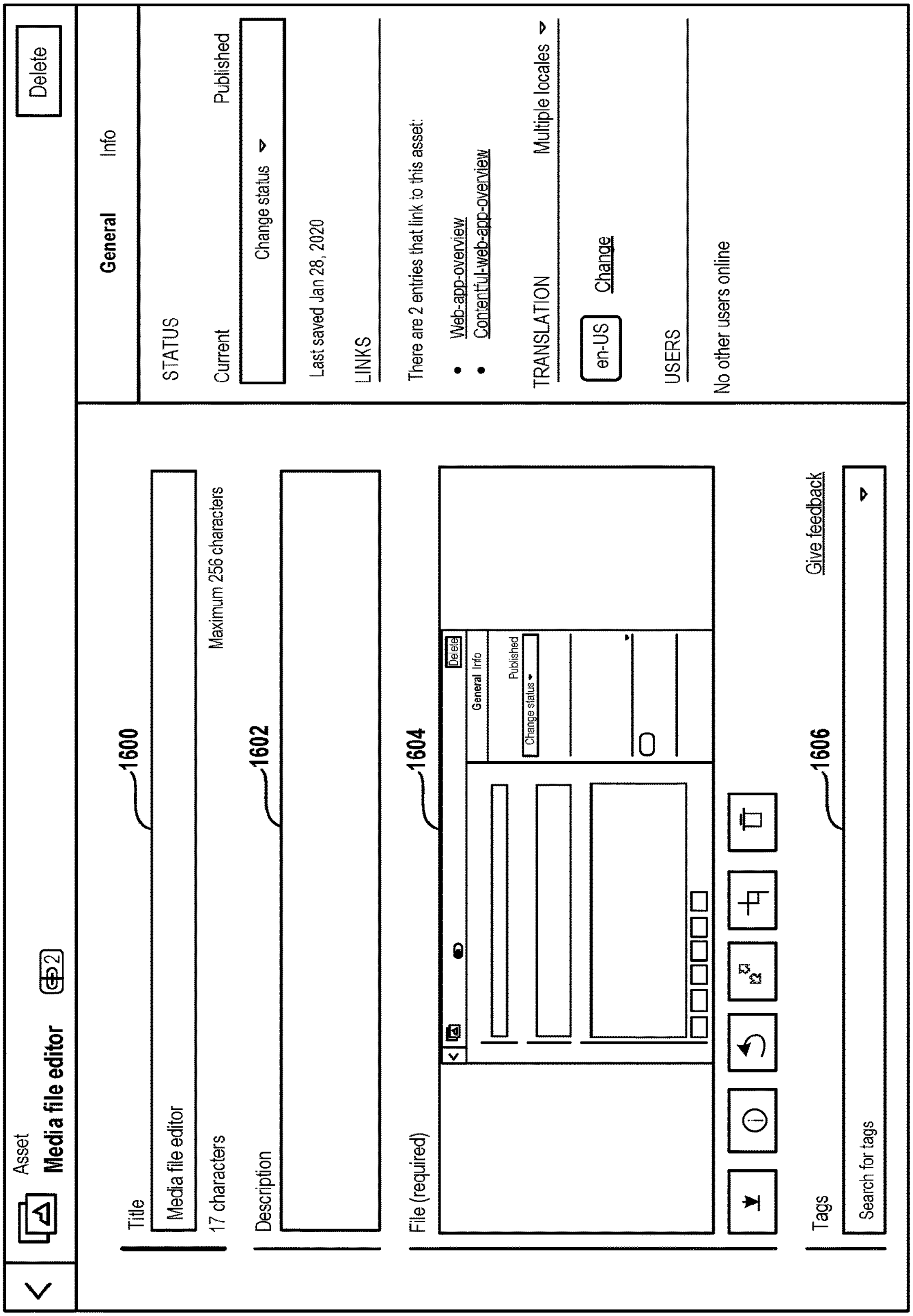
FIG. 13 illustrates an interface view of an Asset editor of a CMS editorial application for editing an Asset, in accordance with implementations of the disclosure.

FIG. 13 illustrates an interface view of an Asset editor of a CMS editorial application for editing an Asset, in accordance with implementations of the disclosure. In the illustrated implementation, various definitional fields for the asset as shown, including a Title 1600, Description 1602, File 1604, and Tags 1606.

Traditional content management systems, e.g., like Wordpress™ and Sitecore™ were designed to store and present content elements like text, images and video on websites. That is, the traditional CMS approach is to manage content in one big bucket, i.e., content, images, HTML, CSS. Unfortunately, this made it impossible to reuse the content because it was commingled with code. As digital platforms have evolved, the need for more flexible solutions emerged. For instance, enterprises are now developing websites, mobile sites, apps, digital displays, conversational interfaces and more. Meanwhile, the traditional CMS organizes content in webpage-oriented frameworks, making it impossible for the same content to adapt to other digital platforms.

In one embodiment, the content management system (CMS) of the described embodiments is a headless CMS. A headless CMS functions as a "content" repository, where the content is separated or decoupled from the presentation layer head. Because of this decoupling, the content is not page-based. As described above, aspects of the headless CMS described herein provide for editors that allow for efficient structuring of content. The structuring of content enables for efficient management of said content and access to said content using specialized application specific interface (API) calls.

In one embodiment, the content infrastructure includes APIs for content management (e.g., content management API), previewing (e.g., content preview API), images (e.g., images API), and display (e.g., content delivery API), to deliver content to any application, platform, form factor, device, IOT, and website.

The content delivery API (CDA) is a read-only API for delivering content from the CMA to apps, websites and other media. In one embodiment, content is delivered as JSON data, and images, videos and other media as files. In one embodiment, the CDA is available via a globally distributed content delivery network. By way of example, the server closest to the user serves all content, both JSON and binary. Serving from the closest server minimizes latency, which especially benefits mobile apps. In one embodiment, content of the CMS is hosted in multiple global data centers, which greatly improves the availability of content. In one configuration, the content management API (CMA) is a read-write API for managing content. Unlike the content delivery API, the content management API requires the user to be authenticated. In some embodiments, the CMA may be used in several use cases, such as automatic imports from WordPress™, Drupal™, and other apps. In other embodiments, the CMA may be integrated with other backend systems, such as an e-commerce shop.

The content preview API is a variant of the CDA for previewing your content before delivering for use by consuming applications (i.e., for display). For example, the content preview API may be used in combination with a "preview" deployment of a website (or a "preview" build of a mobile app) that allows content managers and authors to view their work in-context, as if it were published, using a "preview" access token as though it were delivered by the CDA.

The images API allows for resizing and cropping of images, changing image background colors and/or converting images to different formats. In one embodiment, using the images API for these transformations allows for upload of high-quality assets, delivering exactly what an app needs.

Figure 14:
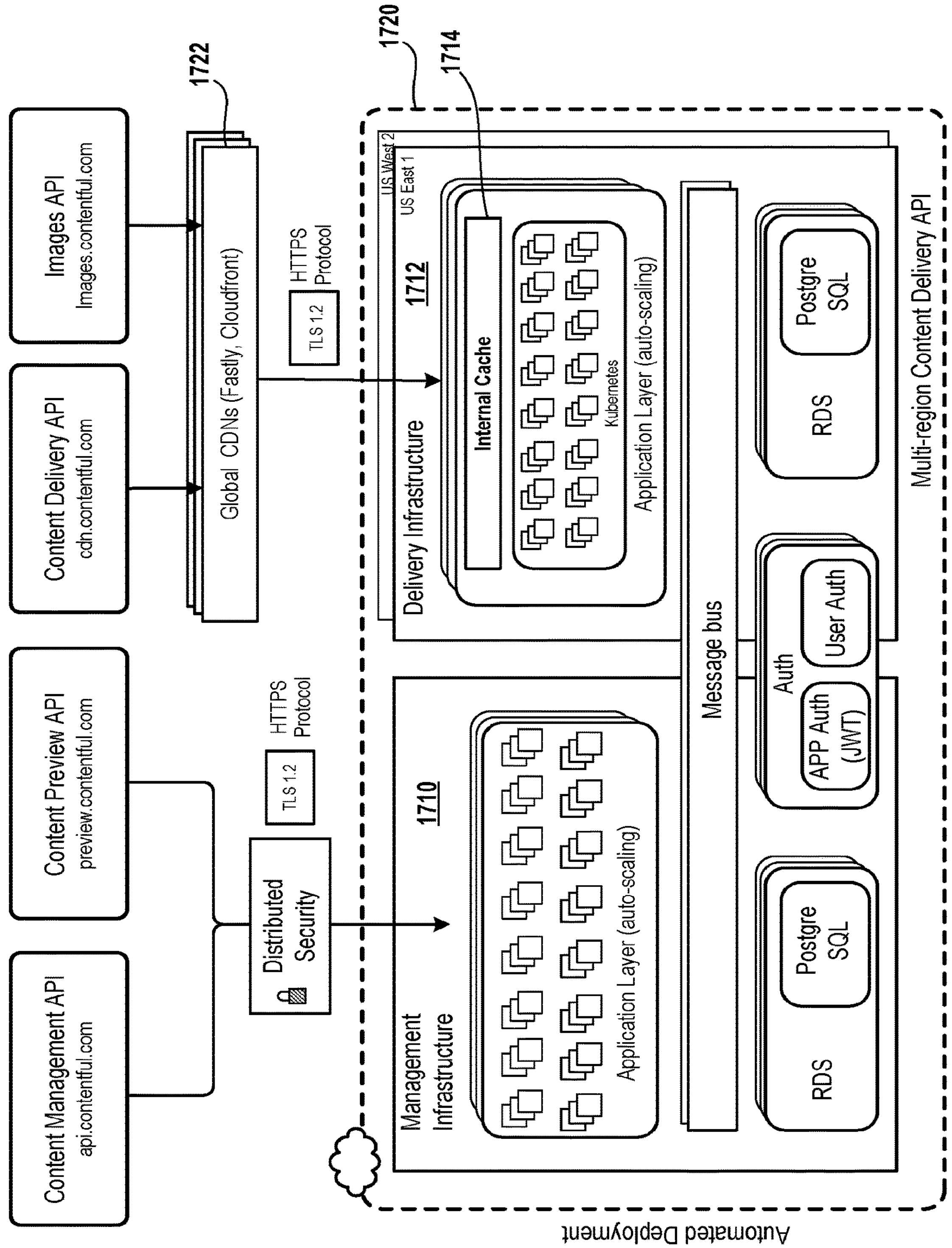
FIG. 14 illustrates an example of how a content management API (CMA) and a content preview API (CPA) can make calls to a content management system (CMS), in accordance with implementations of the disclosure.

FIG. 14 illustrates an example of how the content management API (CMA) and the content preview API (CPA) can make calls to the content management system (CMS) 1720. In one configuration, the CMS 1720 includes compute and storage resources for management of structured content. As described above, a web editor provides for a user interface (UI) that remote client device uses to access the CMS 1720. Based on the type of content creation and/or editing being performed via the UI of the web editor, either the CMA or CPA are used to make API calls to the management 1710 compute and storage resources. The compute and storage resources which run the CMS 1720, in one embodiment, are run in a cloud based environment. The cloud based environment, for example, may be provided by a cloud compute and storage servicing entity, e.g., such as Amazon Web Services (AWS)™, Google™ Cloud, Microsoft™ Azure™, or other serving entity. In some embodiments, these servicing entities are referred to as hosting services, which provide the hardware and internet connectivity to execute applications, processes, and workflows using various types of hardware configurations. In other embodiments, private cloud systems may be run instead of using third party hosting services. In some configurations, the hardware configurations may include virtualized hardware and expandable storage to meet the processing needs of the CMS 1720.

Broadly speaking, the CMS 1720 is executed using cloud infrastructure, which includes the use of multiple interconnected data centers throughout the world.

In one configuration, the CMS 1720 also includes a delivery component 1712, which is configured to service processing operations from the content delivery API and the images API. As shown, in one embodiment, the delivery component 1712 is provisioned with internal cache 1714, which is optimized to interface with a global content delivery network (CDN), which in turn handles calls from the content delivery API and the images API. The CDN, in one embodiment, is a widely distributed service that enables rapid and efficient delivery of content to users throughout the world. In one embodiment, the delivery component 1712 is part of the CMS 1720, and is also executed on compute and storage of a cloud infrastructure. In one embodiment, structured content is prepared and/or edited using the management component 1710, before it is published for external consumption. By separating structured content in the cloud infrastructure, it is possible to prevent non-ready content to be accessed and delivered using the CDA.

Agents accessing the CMS 1720, including organizations, individual users, as well as APPs, are authenticated by an authentication and authorization system. In some implementations, user authentication uses MySQL. In some implementations, APP authentication uses JSON Web Tokens.

It should be apparent, that the present embodiments may be practiced without some or all of these specific details. Modification to the modules, code and communication interfaces are also possible, so long as the defined functionality for the content management system (CMS) or modules of the CMS is maintained. In other instances, well-known process operations have not been described in detail in order not to unnecessarily obscure the present embodiments.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

The foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A method performed by a content management system (CMS) and an edge node of a content delivery network, comprising:

sharing a server secret between the CMS and the edge node;

using, by the CMS, the server secret to generate a signing key, the signing key being transmitted to a client system, wherein the client system receives a request for a content item from a user device, and wherein the client system uses the signing key to generate a signed uniform resource locator (URL) for the content item, the user device being redirected to the signed URL;

responsive to receiving, by the edge node, the signed URL from the user device, then validating the signed URL by the edge node, wherein validating the signed URL uses the server secret to rederive the signing key based on the signed URL;

responsive to successful validation of the signed URL by the edge node, then providing the content item from the edge node to the user device.

2. The method of claim 1, wherein the signing key includes a policy identifying a group of content items that are accessible using the signing key, and wherein the policy further identifies an expiration time of the signing key.

3. The method of claim 2, wherein the signing key is generated based on the policy and the server secret.

4. The method of claim 1, wherein validating the signed URL further includes using the rederived signing key to verify that the signed URL was generated using the signing key.

5. The method of claim 1, wherein the signed URL defines an expiration for the signed URL.

6. The method of claim 1, wherein the method enables validation of secure access to the content asset without requiring communication to the CMS.

7. A method managing access to content requested from a content management system (CMS), the content management system operates using a plurality of servers that manage operations for editing of said content and presentation of said content when requested via application programming interface (API) calls, the plurality of servers of the content management system is further interfaced with a plurality of edge nodes of a content delivery network, the method comprising:

receiving, by the content management system, a request from a customer device of the content management system, the request is for requested content identified by a user device of the customer;

generating, by the content management system, a signing key, the signing key being generated using a server secret that is shared between the edge node and the content management system; and receiving, by the edge node, a signed uniform resource locator (URL) from the user device, the signed URL is generated using the signing key, the signed URL is processed by the edge node to return the requested content to the user device based on a policy.

8. The method of claim 7, wherein processing the signed URL includes, validating the signed URL by the edge node, the validating includes using the server secret to rederive the signing key from said signed URL.

9. The method of claim 8, wherein said validating is processed by said edge node without requiring further communication with a server of the content management system.

10. The method of claim 8, wherein said policy is for a group of content items associated with the requested content, and said policy further identifies an expiration time associated with the signing key.

* * * * *